(12) United States Patent
Cruzado et al.

(10) Patent No.: US 7,961,885 B2
(45) Date of Patent: Jun. 14, 2011

(54) ENCRYPTED JTAG INTERFACE

(75) Inventors: Edwin D. Cruzado, Plant City, FL (US);
William J. Dalzell, Parrish, FL (US);
Brian R. Bernier, Tampa, FL (US)

(73) Assignee: Honeywell International Inc.,
Morristown, NJ (US)

( * ) Notice: Subject to any disclaimer, the term of this patent is extended or adjusted under 35 U.S.C. 154(b) by 1479 days.

(21) Appl. No.: 11/266,792

(22) Filed: Nov. 4, 2005

(65) Prior Publication Data

US 2006/0242465 A1 Oct. 26, 2006

Related U.S. Application Data

(60) Provisional application No. 60/673,291, filed on Apr. 20, 2005, provisional application No. 60/695,613, filed on Jun. 30, 2005.

(51) Int. Cl.
*H04L 9/00* (2006.01)
*G06F 9/44* (2006.01)

(52) U.S. Cl. ............ 380/277; 380/280; 714/30; 717/124

(58) Field of Classification Search .................... 380/280
See application file for complete search history.

(56) References Cited

U.S. PATENT DOCUMENTS

| | | | |
|---|---|---|---|
| 5,117,457 A | 5/1992 | Comerford et al. | |
| 5,568,124 A | 10/1996 | Joyce et al. | |
| 5,705,938 A * | 1/1998 | Kean | 326/39 |
| 6,282,592 B1 * | 8/2001 | Aston et al. | 710/100 |
| 6,400,268 B1 | 6/2002 | Lindskog | |
| 6,523,099 B1 * | 2/2003 | Namekawa | 711/163 |
| 6,965,675 B1 * | 11/2005 | Trimberger et al. | 380/277 |
| 7,400,729 B2 | 7/2008 | Dunstan et al. | |
| 2003/0014643 A1 | 1/2003 | Asami et al. | |
| 2003/0177373 A1 * | 9/2003 | Moyer et al. | 713/189 |
| 2005/0076228 A1 | 4/2005 | Davis et al. | |
| 2005/0193220 A1 | 9/2005 | Little et al. | |

FOREIGN PATENT DOCUMENTS

| | | |
|---|---|---|
| EP | 0 806 737 A2 | 11/1997 |
| EP | 1045352 | 10/2000 |
| FR | 2 862 150 | 5/2005 |

(Continued)

OTHER PUBLICATIONS

International Search Report for PCT/US2006/025762 mailed Feb. 9, 2007.

(Continued)

*Primary Examiner* — Matthew B Smithers
(74) *Attorney, Agent, or Firm* — Shumaker & Sieffert, P.A.

(57) ABSTRACT

In one embodiment, a system comprises JTAG functionality that implements at least a portion of a JTAG protocol. The JTAG functionality supports a test data in (TDI) line, a test data out (TDO) line, a test rest (TR) line, a test mode state (TMS) line, and a test clock (TCLK) line. The system further comprises a debug interface to communicatively couple the system to a debug device external to the system. The debug interface comprises a transmit (TX) line, receive (RX) line, and a clock (CLK) line. The system transmits data output by the JTAG functionality on the TDI input on the RX line of the debug interface and receives data from the debug device on the TX line of the debug interface and provides the received data to the JTAG functionality on the TDO line, TR line and the TMS line.

25 Claims, 12 Drawing Sheets

FOREIGN PATENT DOCUMENTS

| WO | 9502742 | 1/1995 |
|---|---|---|
| WO | 0123980 | 4/2001 |
| WO | WO 01/23980 A1 | 4/2001 |
| WO | WO 02/071231 A1 | 9/2002 |
| WO | WO 2004/056031 A2 | 7/2004 |

OTHER PUBLICATIONS

Office Action dated Mar. 13, 2009 for U.S. Appl. No. 11/266,877 (18 pgs.).
Responsive Amendment dated Jun. 8, 2009 for U.S. Appl. No. 11/266,877 (16 pgs.).
Final Office Action dated Sep. 10, 2009 for U.S. Appl. No. 11/266,877 (19 pgs.).
Responsive Amendment dated Dec. 10, 2009 for U.S. Appl. No. 11/266,877 (14 pgs.).
Office Action dated Feb. 25, 2010 for U.S. Appl. No. 11/266,877 (19 pgs.).
Office Action dated Mar. 30, 2009 for U.S. Appl. No. 11/266,890 (17 pgs.).
Responsive Amendment dated Jun. 30, 2009 for U.S. Appl. No. 11/266,890 (12 pgs.).
Final Office Action dated Oct. 21, 2009 for U.S. Appl. No. 11/266,890 (17 pgs.).
Responsive Amendment dated Dec. 21, 2009 for U.S. Appl. No. 11/266,890 (6 pgs.).
Advisory Action dated Feb. 2, 2010 for U.S. Appl. No. 11/266,890 (3 pgs.).
RCE and Amendment dated Feb. 22, 2010 for U.S. Appl. No. 11/266,890 (16 pgs.).
Responsive Amendment dated May 25, 2010 for U.S. Appl. No. 11/266,877 (14 pgs.).
Final Office Action dated Jul. 28, 2010 for U.S. Appl. No. 11/266,877 (21 pgs.).
RCE and Responsive Amendment dated Oct. 28, 2010 for U.S. Appl. No. 11/266,877 (18 pgs.).
Responsive Amendment dated Sep. 24, 2010 for U.S. Appl. No. 11/266,890 (15 pgs.).
International Search Report and Written Opinion for PCT/US2006/010702, 11 pgs., mailed Oct. 5, 2006.
International Preliminary Report on Patentability for PCT/US2006/010702, 6 pgs., mailed Nov. 4, 2005.
International Preliminary Report on Patentability for PCT/US2006/025762, 9 pgs., mailed Jan. 17, 2008.
Office Action dated Dec. 3, 2010 for U.S. Appl. No. 11/266,877, 20 pages.
Office Action dated May 24, 2010 for U.S. Appl. No. 11/266,890, 23 pages.
Notice of Allowance dated Nov. 17, 2010 for U.S. Appl. No. 11/266,890, 17 pages.

* cited by examiner

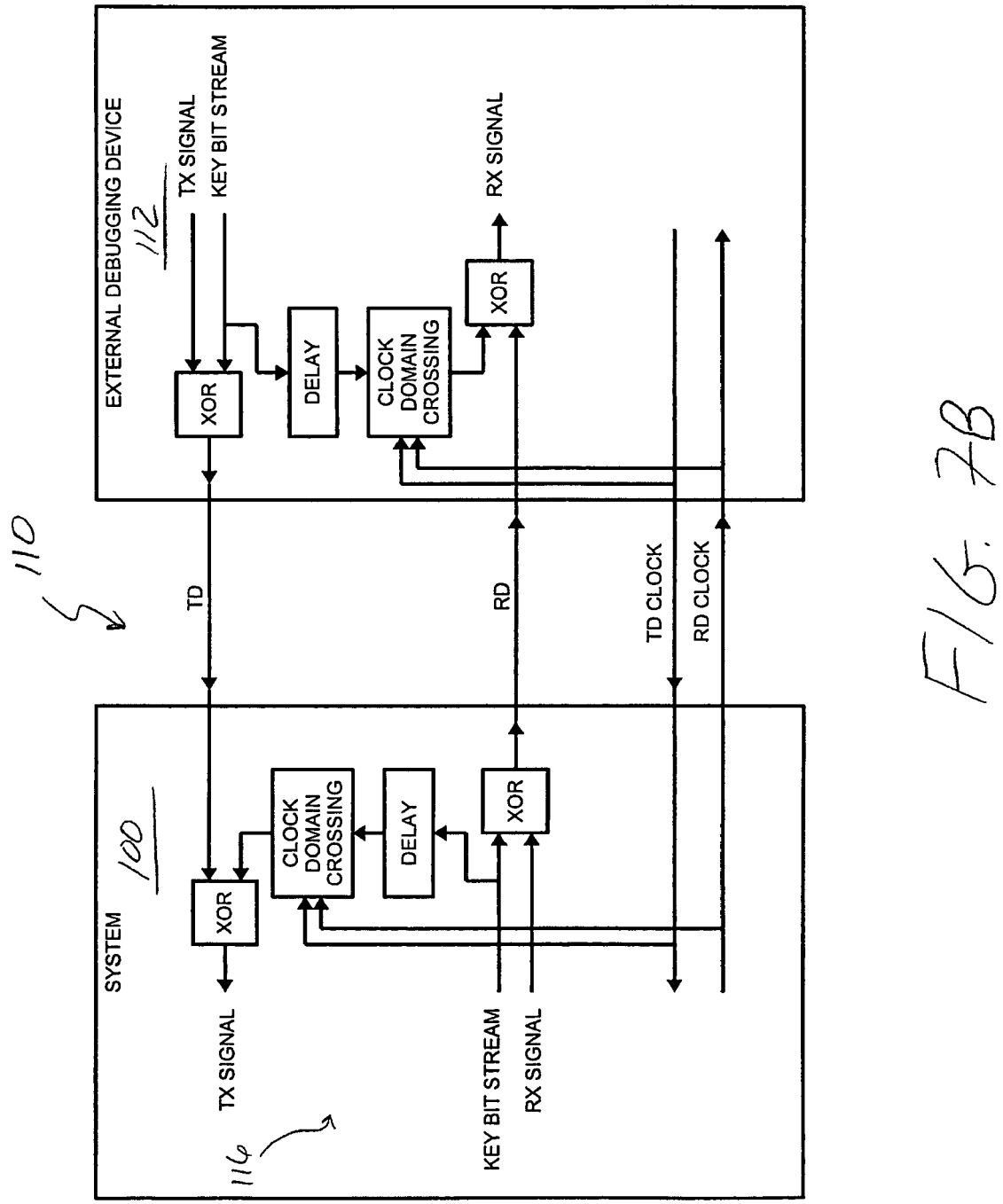

ENCRYPTED JTAG INTERFACE

CROSS REFERENCE TO RELATED APPLICATIONS

This application claims the benefit of U.S. Provisional Application No. 60/673,291, filed on Apr. 20, 2005, (which is also referred to here as the "'291 Provisional Application") and U.S. Provisional Application No. 60/695,613, filed on Jun. 30, 2005, both of which are incorporated herein by reference in their entirety.

This application is related to U.S. patent application Ser. No. 11/170,881, titled "SYSTEM AND METHOD FOR DETECTING UNAUTHORIZED ACCESS TO ELECTRONIC EQUIPMENT OR COMPONENTS", filed on Jun. 30, 2005, which is incorporated herein by reference in its entirety and which is also referred to here as the "'881 application."

This application is also related to the following U.S. Patent Applications filed on even date herewith (all of which are incorporated herein by reference in their entirety):

U.S. patent application Ser. No. 11/266,877, titled "HARDWARE ENCRYPTION KEY FOR USE IN ANTI-TAMPER SYSTEM".

U.S. patent application Ser. No. 11,266,890, titled "ENCRYPTED DEBUG INTERFACE".

U.S. Pat. No. 7,509,250, titled "HARDWARE KEY CONTROL OF DEBUG INTERFACE".

BACKGROUND

In some applications, a manufacturer or designer of electronics equipment wishes to prevent third parties from reverse engineering such equipment (at for example, the unit or system level, board level, or component level). One approach to doing this is to include a mechanical lock that is designed to prevent a case (or other enclosure) from being opened (or to otherwise prevent the contents of the case from being physically accessed) when locked. Such a mechanical lock does not, however, prevent access to those interfaces that are physically accessible from outside of the case or other enclosure (for example, a debug interface such as an interface supporting the Institute for Electrical and Electronics Engineers (IEEE) 1149.1 Standard (also referred to here as a "JTAG" interface)).

Some reverse-engineering techniques access electronics enclosed within a mechanically locked case by communicating with such electronics using externally accessible interfaces. For example, a debug interface is typically designed to provide a mechanism by which an external device is able to inspect and change the state of various items of electronics contained within such a mechanically locked case (for example, by inspecting and/or changing the state of registers, memory, or I/O interfaces). Thus, such a debug interface can be exploited in some cases to reverse engineering such equipment.

SUMMARY

In one embodiment, a system comprises JTAG functionality that implements at least a portion of a JTAG protocol. The JTAG functionality supports a test data in (TDI) line, a test data out (TDO) line, a test rest (TR) line, a test mode state (TMS) line, and a test clock (TCLK) line. The system further comprises a debug interface to communicatively couple the system to a debug device external to the system. The debug interface comprises a transmit (TX) line, receive (RX) line, and a clock (CLK) line. The system transmits data output by the JTAG functionality on the TDI input on the RX line of the debug interface and receives data from the debug device on the TX line of the debug interface and provides the received data to the JTAG functionality on the TDO line, TR line and the TMS line.

In another embodiment, a debug device comprises JTAG functionality that implements at least a portion of a JTAG protocol. The JTAG functionality supports a test data in (TDI) line, a test data out (TDO) line, a test rest (TR) line, a test mode state (TMS) line, and a test clock (TCLK) line. The debug device further comprises a debug interface to communicatively couple the debug device to a system under test that is external to the debug device. The debug interface comprises a transmit (TX) line, receive (RX) line, and a clock (CLK) line. The debug device transmits data output by the JTAG functionality on the TDO line, TR line and the TMS line on the TX line of the debug interface and receives data from the system under test device on the RX line of the debug interface and provides the received data to the JTAG functionality on the TDI input.

In another embodiment, a method comprises transmitting data from a test data in (TDI) line of a JTAG interface included in a system under test on a first line of a debug interface of the system under test for communicatively coupling the system under test to a debug device external to the system under test. The method further comprises receiving data on a second line of the debug interface of the system under test and providing the data received on the second line of the debug interface to a test data out (TDO) line, a test rest (TR) line, and a test mode state (TMS) line of the JTAG interface. The method further comprises receiving a clock signal on a clock line of the debug interface and providing the clock signal on the test clock (TCLK) line of the JTAG interface.

In another embodiment, a method comprises transmitting data from a test data out (TDO) line, a test rest (TR) line, and a test mode state (TMS) of a JTAG interface included in a debug device on a first line of a debug interface of the debug device for communicatively coupling the debug device to a system under test. The method further comprises receiving data from a second line of the debug interface and providing the data received on the second line of the debug interface to the test data in (TDI) line of the JTAG interface. The method further comprises transmitting a clock signal from a test clock (TCLK) line of the JTAG interface on a clock line of the debug interface.

The details of one or more embodiments of the claimed invention are set forth in the accompanying drawings and the description below. Other features and advantages will become apparent from the description, the drawings, and the claims.

DRAWINGS

FIG. 7A and FIG. 7B are high-level block diagrams illustrating approaches to encrypting and decrypting communications that occur over a debug interface, where FIG. 7A illustrates an asynchronous approach and FIG. 7B a synchronous approach.

Like reference numbers and designations in the various drawings indicate like elements.

DETAILED DESCRIPTION

Figure 1:
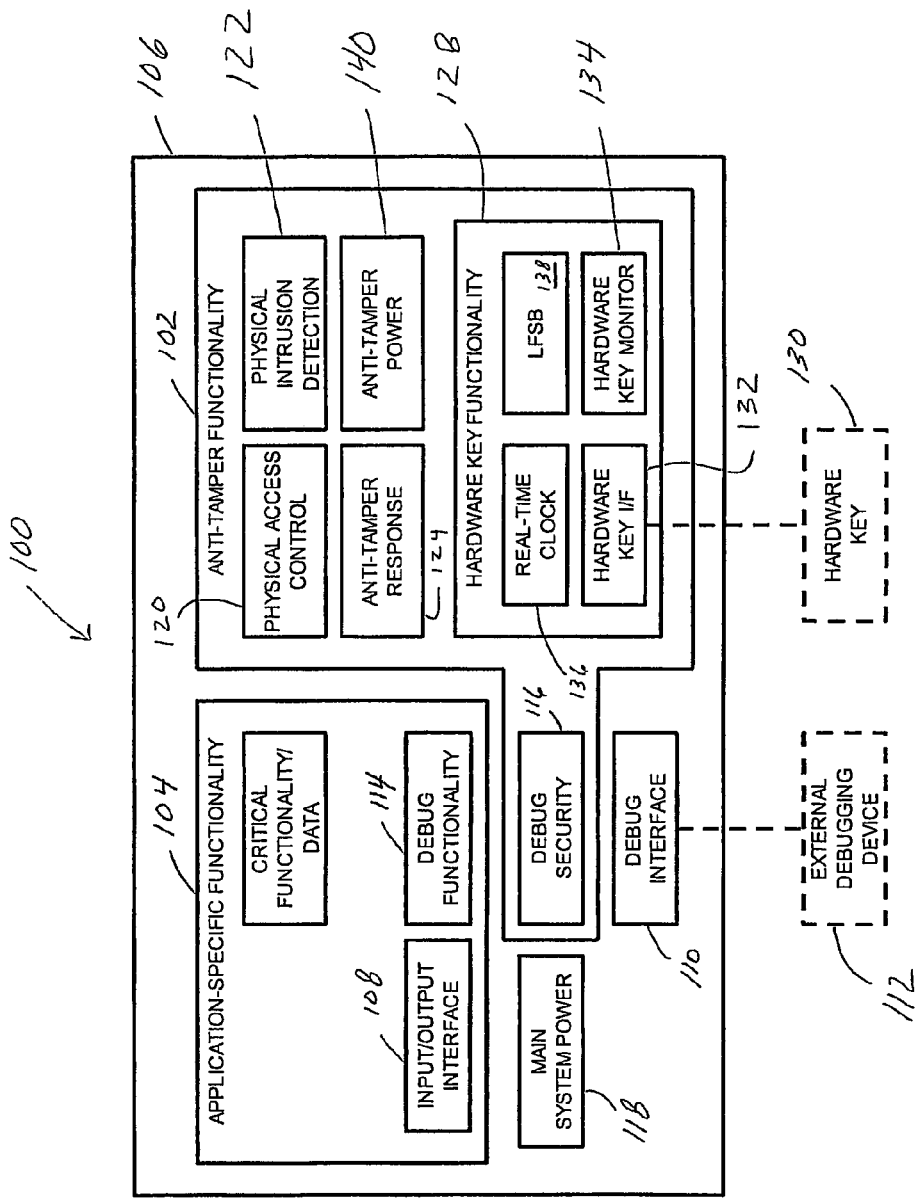
FIG. 1 is a high-level block diagram of one embodiment a system that makes use of anti-tampering functionality.

FIG. 1 is a high-level block diagram of one embodiment of a system 100 that makes use of anti-tampering functionality 102. The system 100 is also referred to as a "system under protection" (SUP). Embodiments of the system 100 are suitable for use in variety of applications (for example, military and commercial applications). The system 100 comprises application-specific functionality 104 that comprises the various electronic components required to implement the application-specification functionality for which the system 100 is designed. The application-specific functionality 104 is implemented using any suitable form of software, hardware, and combinations thereof. The application-specific functionality 104 and the anti-tamper functionality 102 are housed within an enclosure 106 such as a case. For example, in one implementation of such an embodiment, the system 100 is implemented as a "box" that comprises one or more boards on which various electronics components are mounted in order to implement the application-specific functionality for which the system 100 is designed. In such an implementation, the enclosure 106 generally has the shape of a box in which the various components of the system 100 are housed. Other embodiments are implemented in other ways.

In the particular embodiment shown in FIG. 1, the application-specific functionality 104 includes at least one input/output (I/O) interface 108 (for example, an RS-232 interface or a universal serial bus (USB) interface) that is accessible to a device that is external to the system 100 (that is, a device that is located outside of the enclosure 106). In one implementation of such an embodiment, the input/output interface 108 is implemented using an interface that requires such an external device to be physically coupled to the I/O interface 108 (for example, using an appropriate cable and connector). In such an implementation, an opening must be provided in the enclosure 106 through which such an external device can be physically coupled to the I/O interface 108. In another implementation, the I/O interface 108 is implemented using an interface that does not require an external device to be physically coupled to the I/O interface 108 (for example, using a wireless interface). In such an implementation, an opening need not be formed in the enclosure 106 for an external device to communicate with the I/O interface 108 (which, in some applications, is especially desirable).

The system 100, in the embodiment shown in FIG. 1, also includes a debug interface 110 (for example, a JTAG interface). The debug interface 110 provides an interface by which an external debugging device 112 (for example, a personal computer executing appropriate debugging software and having an interface compatible with the debug interface 110) can be communicatively coupled to debug functionality 114 supported by one or more components used to implement the application-specific functionality 104. In one implementation, the debug functionality 114 supports the JTAG protocol. In the particular embodiment shown in FIG. 1, the anti-tamper functionality 102 comprises debug security functionality 116 that (as described below in connection with FIG. 6) determines when such an external debugging device 112 should be permitted to interact with the debug functionality 114 supported by the application-specific functionality 104 via the debug interface 110. The debug functionality 114, when permitted by the debug security functionality 116, receives, interprets, and carries out any commands received from the external debugging device 112.

The system 100 also comprises a main system power supply 118 that supplies power to the various components of the system 100 when the system 100 is a normal operational mode. The main system power supply 118 comprises any suitable power supply including, for example, a battery interface for receiving power from one or more internal batteries (replaceable and/or rechargeable batteries) (not shown) included in the system 100 and/or an interface for receiving power from a source external to the system 100 (for example, from an external battery, power generator, or main power grid).

In the embodiment shown in FIG. 1, the anti-tamper functionality 102 comprises a physical access control mechanism 120 (such as a mechanical lock) that attempts to prevent physical access to the components of the system 100 housed within the enclosure 106 or a portion thereof. The anti-tamper functionality 102 further comprises a physical-intrusion detection mechanism 122. In one implementation of such an embodiment, the physical-intrusion detection mechanism comprises an optical mesh applied to an inner wall of the enclosure 106 in which an optical signal is maintained and one or more sensors that detects when the optical signal is disrupted (for example, by an attempted intrusion). The anti-tamper functionality 102 further comprises an anti-tamper response mechanism 124 that performs (or causes to be performed) one or more anti-tamper related actions (for example, in response to one or more intrusion attempts or when another intrusion-related condition is true). Examples of such actions include signaling an alarm (either silent or audible), transmitting a homing beacon, and/or disabling or destroying one or more components of the system 100. For example, in the embodiment shown in FIG. 1, the application-specific functionality 104 comprises critical functionality and/or data 126 that is disabled, destroyed and/or deleted by an anti-tamper related action performed (or caused to be performed) by the anti-tamper response mechanism 124. In the particular embodiment shown in FIG. 1, the anti-tamper functionality 102 also includes an anti-tamper power supply 140 for providing power to carry out such anti-tamper related actions in the event there is no main system power 118. Examples of such anti-tamper functionality are described in the '291 Provisional Application and the '881 application.

The anti-tamper functionality 102, in the embodiment shown in FIG. 1, further comprises hardware key functionality 128 for interacting with and authorizing a hardware key 130. The hardware key functionality 128 comprises a hardware key interface 132 that provides a point at which the hardware key 130 can be communicatively coupled to the system 100 (and the hardware key functionality 128).

As described below, in one embodiment, the hardware key 130 is used to indicate to the system 100 which mode the system 100 is allowed to operate in. In one implementation of such an embodiment, the system 100 supports at least three modes. One mode is a "test" mode in which the enclosure 106 of the system 100 can be opened and the debug interface 110 can be used to interact with the debug functionality 114 of the application-specific functionality 104 (that is, an external debugging device 112 is permitted to communicate with the debug functionality 114 over the debug interface 110). A second mode is a "stored" mode in which the application-specific functionality 104 of the system 100 is disabled. While the system 100 is in stored mode, all the protection mechanisms supported by the anti-tamper functionality 102 are enabled (for example, the physical access control 120 does not permit the enclosure 106 to be opened or otherwise accessed), and the debug interface 110 is disabled (that is, an external debugging device 112 is not permitted to communicate with the debug functionality 114 over the debug interface 110). In one such implementation, a battery external to the system 100 is used to power the system 100 while the system 100 is operated in the stored mode. A third mode is an "in-service" mode in which the application-specific functionality 104 of the system 100 is enabled and the system 100 is powered using the main system power 118. While the system 100 is operated in the in-service mode, in one such implementation, all the protection mechanisms supported by the anti-tamper functionality 102 are also enabled and the debug interface 110 is disabled.

In one implementation of the embodiment shown in FIG. 1, the hardware key interface 132 is implemented using an interface that requires the hardware key 130 to be physically coupled to the hardware key interface 132 (for example, using an appropriate connector). In such an implementation, an opening must be provided in the enclosure 106 through which the hardware key interface 132 can be accessed in order to physically connect the hardware key 130 to the hardware key interface 132. In another implementation, the hardware key interface 132 is implemented using an interface that does not require the hardware key 130 to be physically coupled to the hardware key interface 132 (for example, using a wireless interface). In such an implementation, an opening need not be formed in the enclosure 106 for the hardware key interface 132 (which, in some applications, is especially desirable).

The hardware key functionality 128 further comprises a hardware key monitor 134. The hardware key monitor 134 monitors the hardware key interface 132 and determines when a hardware key 130 is communicatively coupled to the hardware key interface 132. Also, in one embodiment, the hardware key monitor 134 implements a hardware key protocol that is used to authenticate the hardware key 130 and/or to change the operation mode of the system 100 (for example, as described below in connection with FIG. 5). Moreover, in the particular embodiment shown in FIG. 1, the hardware key functionality 128 also comprises a real-time clock 136 and a linear feedback shift register 138 that is used in the processing performed by the hardware key functionality 128 (as described below).

Figure 2:
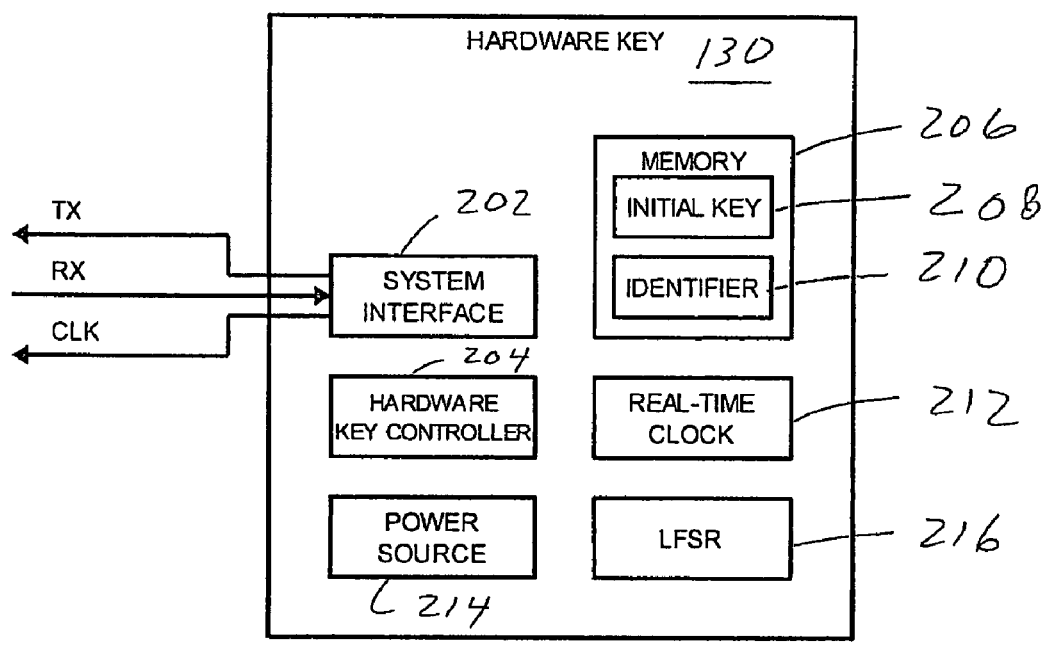
FIG. 2 is a high-level block diagram of one embodiment of a hardware key.

FIG. 2 is a high-level block diagram of one embodiment of a hardware key 130. The hardware key 130 shown in FIG. 2 is described here as being implemented for use in the system 100 of FIG. 1. It is to be understood, however, that other embodiments of a hardware key 130 are implemented in other ways (for example, for use in other types of systems).

The hardware key 130 comprises a system interface 202 that is used to communicatively couple the hardware key 130 to the hardware key interface 132 of the system 100. In the particular embodiment shown in FIG. 2, the hardware key interface 132 of the system 100 is implemented using an interface that requires the hardware key 130 to be physically coupled to the hardware key interface 132 (for example, using an appropriate connector). In such an implementation, the hardware key interface 132 of the system 100 and the system interface 202 of the hardware key 130 are implemented as a 3-line interface comprising a transmit line (TX), a receive line (RX), and a clock line (CLK). It is to be understood, however, that in other embodiments, the hardware key interface 132 of the system 100 and the system interface 202 of the hardware key 130 are implemented in other ways. For example, in one alternative embodiment, the hardware key interface 132 of the system 100 and the system interface 202 of the hardware key 130 make use of an interface that does not require the hardware key 130 to be physically coupled to the hardware key interface 132 (for example, using a wireless interface).

In the embodiment shown in FIG. 2, the hardware key 130 further comprises a hardware key controller 204 that carries out at least a portion of the processing described here as being performed by the hardware key 130.

The hardware key 130 also comprises memory 206 in which an initial key 208 and identifier 210 are stored. The initial key 208 comprises information used for initially authenticating the hardware key 130 to the system 100. Also, in such an embodiment, the identifier 210 comprises information that identifies a mode that is associated with the hardware key 130. When the hardware key 130 is communicatively coupled to the system 100 and the system 100 determines that the hardware key 130 is authorized, the hardware key 130 provides the identifier 210 to the system 100 (more specifically, to the hardware key monitor 134 of the hardware key functionality 128) in order to indicate to the system 100 that the system 100 is permitted (or required) to operate in the mode identified by the identifier 210.

The hardware key 130, in the embodiment shown in FIG. 2, also comprises a real-time clock 212 and a power source 214. The clock 212 is used to generate a clock signal and a timestamp that are supplied to the system 100 when the hardware key 130 is communicatively coupled to the system 100 via the hardware key interface 132. The power source 214 is used to provide power to the components of the hardware key 130. In one implementation of such an embodiment, the power source 214 is also used to provide power to the system 100 in addition to providing power to the hardware key 130. In such an implementation, the hardware key interface 132 of the system 100 and the system interface 202 of the hardware key 130 also include power lines (not shown) over which power is supplied from the power source 214 of the hardware key 130 to the system 100 (and the components thereof). In one implementation, the power source 214 comprises a battery. In another implementation, the power source 214 comprises (in addition to or instead of a battery) an appropriate interface for receiving power from an external source (for example, from a main power grid).

Figure 3A:
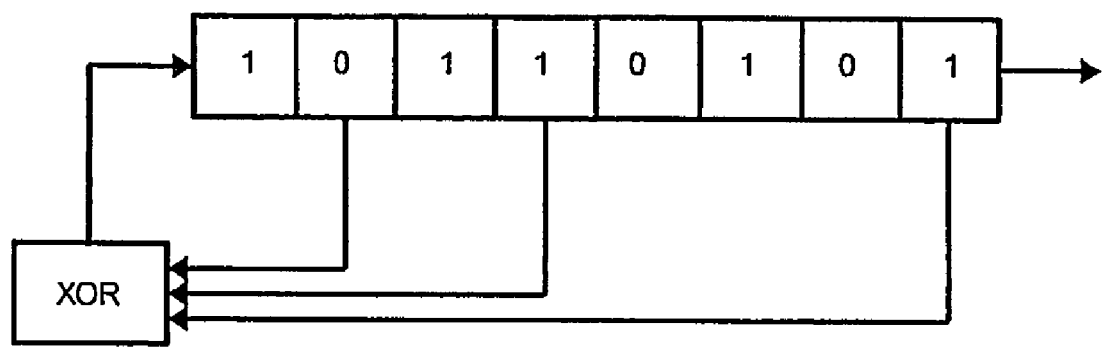
FIG. 3A is a block diagram of one example of a linear shift register.
Figure 3B:
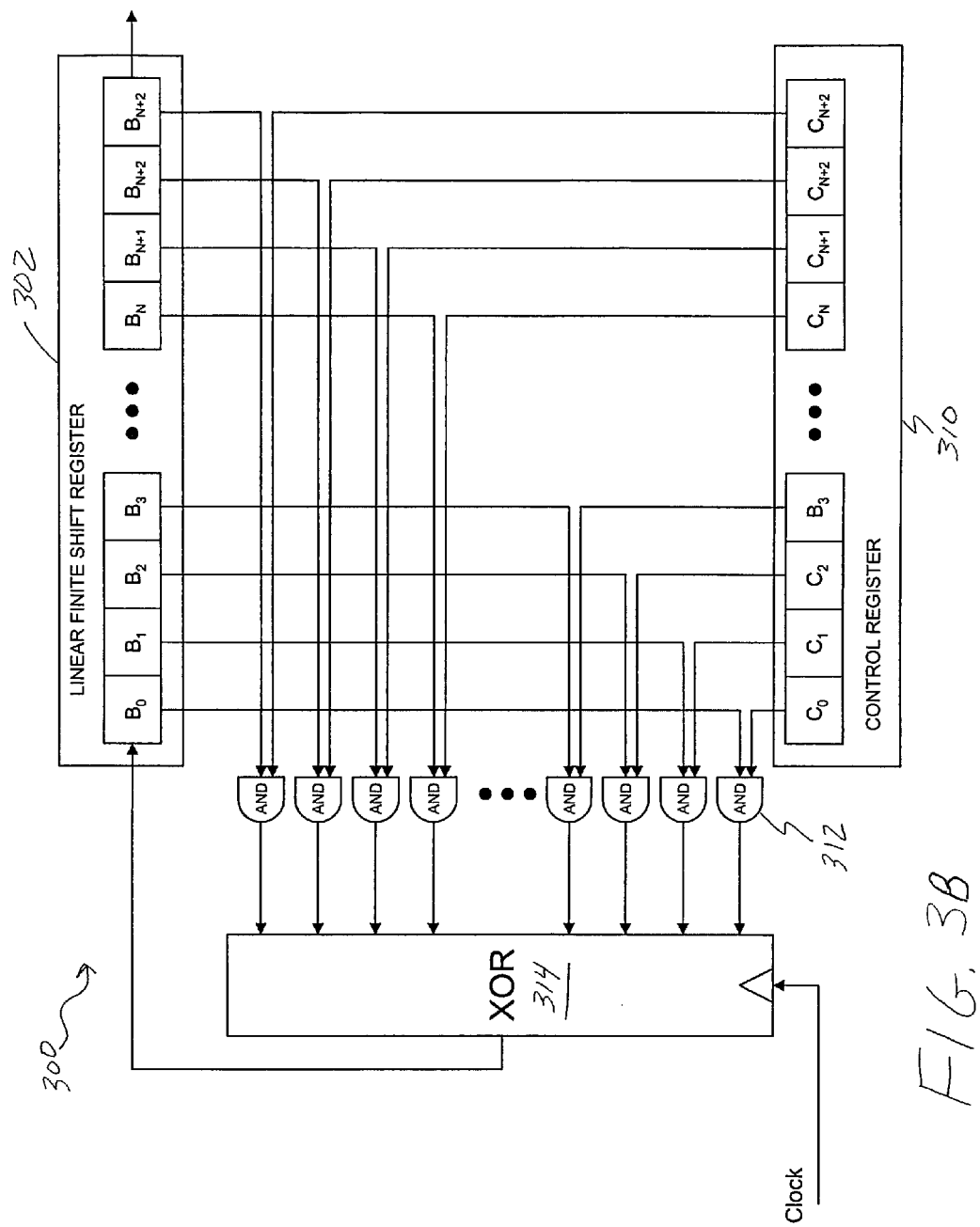
FIG. 3B is a variation of FIG. 3A demonstrating the use of a control register to modify the polynomial defined by the linear shift register.

In the embodiment shown in FIGS. 1 and 2, the hardware key 130 implements a linear feedback shift register 216 of the same type as the linear feedback shift register 138 included in the hardware key functionality 128. One example of such a linear shift register is shown in FIG. 3A (with a variation thereof shown in FIG. 3B). As shown in FIG. 3A, each linear feedback shift register comprises a series of n cells (referred to here as "cell 1", "cell 2", through "cell N"), where one bit is stored in each of the N cells. The initial value stored in the linear feedback shift register is referred to here as the "seed value" for the register. Periodically (for example, when the linear feedback shift register is clocked), the bits contained in the cells are shifted in a predetermined direction. That is, the bit previously stored in cell 1 is stored in cell 2, the bit previously stored in cell 2 is stored in cell 3, and so on. The bit previously stored in cell N is taken as the output of the linear feedback shift register. The bit that is stored in cell 1 is determined by evaluating a polynomial that comprises an exclusive OR (XOR) operation performed on the bits previously stored in one or more of the other cells. The one or more cells that are used in the XOR operation to generate the new bit that is stored in cell 1 are also referred to here as the "tapped" cells or the "taps." One commonly known polynomial used in such an approach is the CRC-16 polynomial. Other polynomials can be used. In one implementation, the polynomial that is used in each of the linear feedback shift registers 138 and 216 varies from time to time (as described in connection with FIGS. 4 and 5). A variation of the example shown in FIG. 3A is shown in FIG. 3B. In the example of a linear feedback shift register 300 shown in FIG. 3B the cells of the linear feedback shift register 300 are stored in a linear finite shift register 302 (each bit or cell of which is labeled $B_0$, $B_1$, $B_2$ through $B_N$, $B_{N+1}$, and $B_{N+2}$ in the example of FIG. 3B). A control register 310 is used to modify the polynomial by "turning on" or "turning off" taps. Each bit of the control register 310 (labeled $C_0$, $C_1$, $C_2$ through $C_N$, $C_{N+1}$, and $C_{N+2}$ in the example of FIG. 3B) controls a respective one of the cells of the linear finite shift register 302. Each cell of the linear finite shift register 302 is logically AND'ed (using a respective AND gate 312) with a corresponding bit of the control register 310, and the result of such AND operation is input to a XOR gate 314 of the linear feedback shift register 300. In this example, if a bit of the control register 310 is set to a logical value of "0", the corresponding cell of the linear finite shift register 302 is not tapped; if a bit of the control register 310 is set to a logical value of "1", the corresponding cell of the linear finite shift register 302 is tapped. Each tap is a variable in the polynomial expression. It is to be understood that the control register 310 can be the same size as the linear finite shift register 302 or can be some smaller size. If a control register 310 is smaller, such a control register 310 will not control all bits of the linear finite shift register 302 and thus will not be able implement all possible polynomial combinations.

Figure 4:
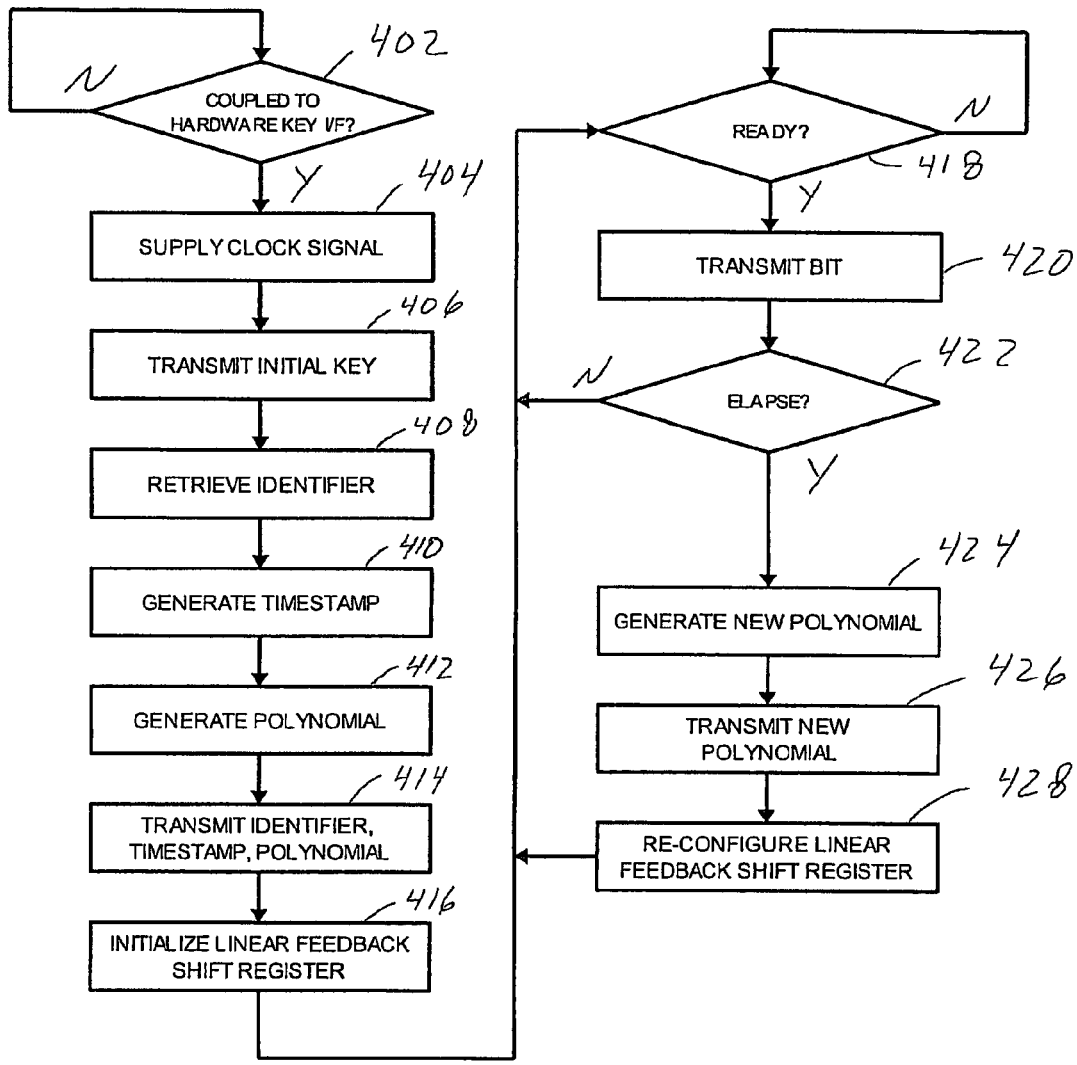
FIG. 4 is a high-level flow diagram of one embodiment of a method performed by the hardware key of FIG. 2.
Figure 5:
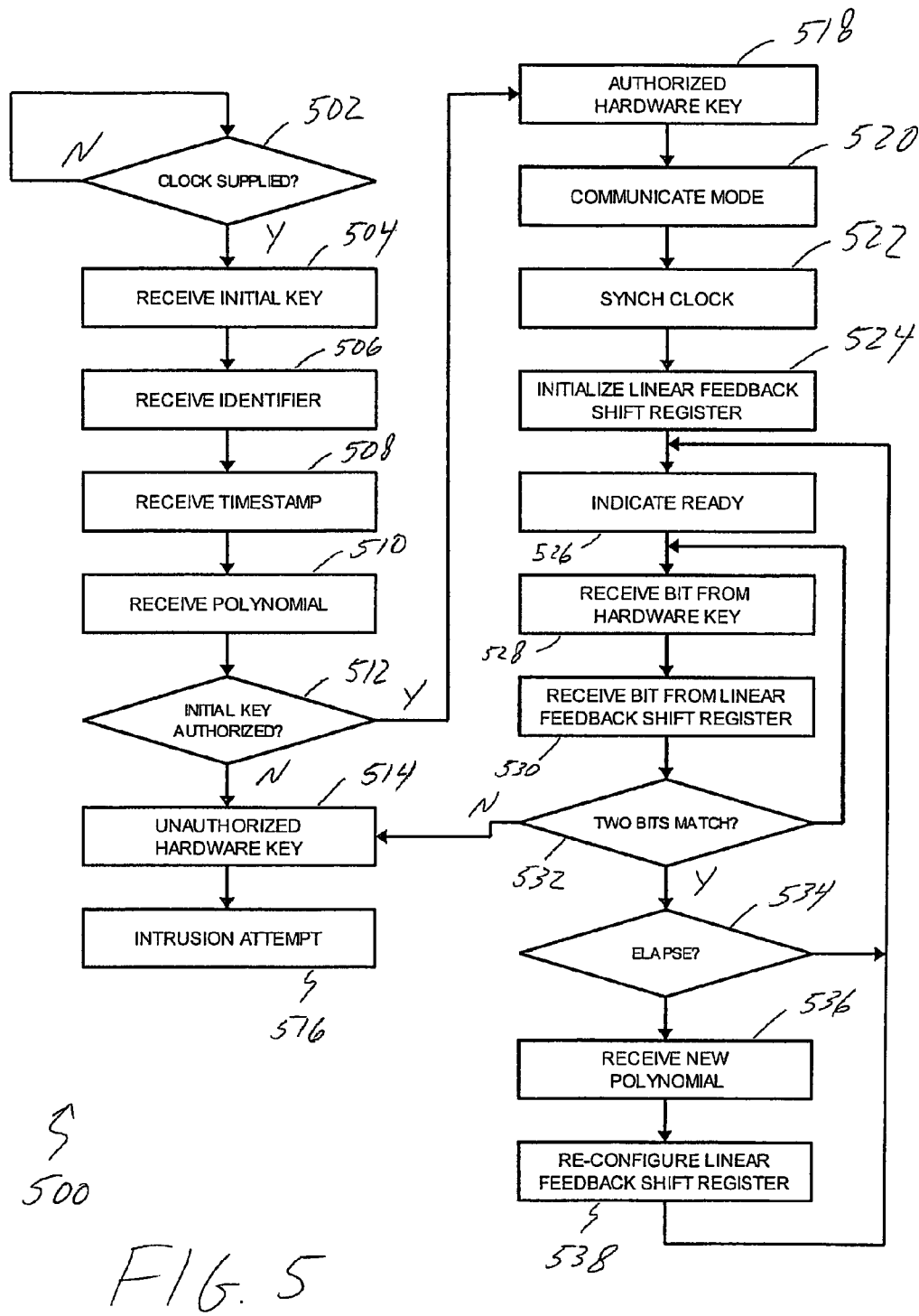
FIG. 5 is a high-level flow diagram of one embodiment of a method performed by the system of FIG. 1.

Processing performed by the system 100 and the hardware key 130 in connection with the authentication of the hardware key 130 is shown in FIGS. 4 and 5. FIG. 4 is a high-level flow diagram of one embodiment of a method 400 performed by the hardware key 130 and FIG. 5 is a high-level flow diagram of one embodiment of a method 500 performed by the system 100. Methods 400 and 500 are described here as being implemented using the hardware key 130 of FIG. 2 and the system 100 of FIG. 1, although other embodiments are implemented in other ways. In the embodiment of method 400 shown in FIG. 4, the processing described here in connection with method 400 is performed primarily by the hardware key controller 204 of the hardware key 130. In the embodiment of method 500 shown in FIG. 5, the processing described here in connection with method 500 is performed primarily by the hardware key monitor 134 of the system 100.

As shown in FIG. 4, when the hardware key 130 is coupled to the hardware key interface 132 of the system 100 (checked in block 402), the hardware key 130 supplies a clock signal to the system 100 via the hardware key interface 132 (block 404) and transmits its initial key 208 to the system 100 via the hardware key interface 132 (block 406). The clock signal provided by the hardware key 130 is used by the system 100 as the clock for the communications that occur on the hardware key interface 132 and (after synchronizing and initialization) for the linear feedback shift register 138 of the system 100. In one implementation of such an embodiment, the hardware key's 130 transmission of the initial key 208 is encrypted by the hardware key 130 using a symmetric encryption algorithm (for example, using the Data Encryption Standard (DES) encryption algorithm) with a predetermined encryption key of which the hardware key 130 and the system 100 have a priori knowledge. In another implementation of such an embodiment, the hardware key's 130 transmission of the initial key 208 is encrypted by the hardware key 130 using an asymmetric encryption algorithm (for example, using a public key encryption algorithm). In such an implementation, the hardware key 130 and the system 100 either have a priori knowledge of each other's public key or would engage in a public key exchange process prior to the transmission of the initial key 208. In other implementations, this transmission is not encrypted. Moreover, any appropriate data transmission scheme can be used for the data transmissions between the hardware key 130 and the system 100 over the hardware key interface 132.

After transmitting the initial key 208, the hardware key 130 retrieves the identifier 210 for the hardware key 130 from the memory 206 (block 408) and generates a timestamp (block 410). In this embodiment, the timestamp is generated using the real-time clock 212 of the hardware key 130 and is used by the hardware key monitor 134 of the system 100 to synchronize the real-time clock 136 to the real-time clock 212 of the hardware key 130. The hardware key 130 also generates (or otherwise obtains) a polynomial (block 412). In this embodiment, the polynomial specifies the length of the linear feedback shift registers 138 and 216 (that is, the number of cells N of the linear feedback shift registers 138 and 216) and the tapped cells of the linear feedback shift registers 138 and 216. The polynomial also specifies a seed value that is to be used by the linear feedback shift registers 138 and 216. In the embodiment shown in FIG. 4, the hardware key 130 selects one or more attributes of the polynomial (that is, the length, taps, and/or seed value) using, for example, a random or pseudo-random selection process and/or based on the real-time clock 212. In other embodiments, the same initial polynomial is used each time the hardware key 130 is communicatively coupled to the hardware key interface 132 of the system 100.

The hardware key 130 then transmits the identifier 210, timestamp, and polynomial to the system 100 via the hardware key interface 132 (block 414). In one implementation of such an embodiment, this transmission is encrypted using symmetric encryption; in another implementation, this transmission is encrypted using asymmetric encryption. In other implementation, this transmission is not encrypted. The hardware key 130 also initializes the linear feedback shift register 216 with the polynomial (that is, configures the linear feedback shift register 216 to have the number of cells specified by the polynomial, to use the taps indicated in the polynomial, and to use the seed value specified in the polynomial) (block 416).

After the system 100 indicates that it is ready (for example, by sending a "ready" message on the hardware key interface 132) (checked in block 418), the hardware key 130 starts transmitting to the system 100 the bits output from the linear feedback shift register 216 on each clock pulse (block 420).

In the particular embodiment shown in FIG. 4, the polynomial that is used by the linear feedback shift registers 138 and 216 is changed at periodic intervals. When the current periodic interval has elapsed since last changing the polynomial (checked in block 422), the hardware key 130 generates a new polynomial (block 424) and transmits the new polynomial to the system 100 via the hardware key interface 132 (block 426). In one implementation of such an embodiment, the new polynomial is transmitted to the system 100 using stream cipher encryption by XOR'ing the new polynomial, bit-by-bit, with the output of the linear feedback shift register 216. In other implementations, the transmission of the new polynomial is encrypted in other ways or not encrypted. After transmitting the new polynomial, the hardware key 130 then re-configures the linear feedback shift 216 using the new polynomial (block 428) and loops back to block 418 to resume transmitting a bit stream.

In one implementation of the embodiment of method 400, the hardware key 130 ceases operation if it receives any information on the system interface 202 that the hardware key 130 is not expecting at that time. In one example, someone may attempt to reverse engineer the hardware key 130 by connecting the hardware key's TX line to one or more the hardware key's RX line. In such an implementation, if the hardware key 130 receives data that the hardware key 130 itself has just transmitted (which the hardware key 130 would not be expecting to receive at that time), the hardware key 130 ceases operation and does not transmit any further data. In one such implementation, the hardware key 130 is disabled for a predetermined period (for example, 24 hours). In another such implementation, the hardware key 130 is permanently disabled (for example, by erasing the data that is used by the hardware key controller 204).

The processing performed by the system 100 in response to the processing of method 400 performed by the hardware key 130 is shown in FIG. 5.

When the hardware key monitor 134 of the system 100 detects that a clock signal is being supplied on the clock line of the hardware key interface 132 (checked in block 502), the hardware key monitor 134 receives, from the hardware key 130, the initial key 208 (block 504), the identifier 210 (block 506), the timestamp (block 508) and the polynomial (block 510). In an implementation where the hardware key 130 transmits this data in encrypted form, the hardware key monitor 134 decrypts the encrypted data using a suitable decryption technique.

The hardware key monitor 134 then determines if the received initial key 208 is a key that the system 100 considers an authorized key (block 512). In one implementation of such an approach, the system 100 stores a set of authorized keys and the hardware key monitor 134 determines if the initial key 208 received form the hardware key 130 matches any of the keys contained in the set. If there is not a match, the initial key 208 received from the hardware key 130 is not considered to be an authorized key and the hardware key 130 is not authorized (block 514). Also, when this happens, in the embodiment shown in FIG. 5, an intrusion attempt is considered to have occurred (block 516). In one implementation, when an intrusion attempt occurs, the anti-tamper response mechanism 124 takes one or more anti-tamper related actions in response to the intrusion attempt.

If there is a match, the hardware key 130 is an authorized key (block 518) and the processing described here in connection with blocks 520 through 532 is performed.

If the hardware key 130 is authorized, the hardware key monitor 134 communicates, to the application-specific functionality 104 and the anti-tamper functionality 102 of the system 100, the mode identified in the identifier 210 received from the hardware key 130 (block 520). For example, if the identifier 210 identifies a test mode, the application-specific functionality 104 and the anti-tamper functionality 102 of the system 100 are operated in a test mode (for example, the debug interface 110 is enabled such that any external debugging device 112 communicatively coupled to the debug interface 110 is able to communicate with the debug functionality 114 of the system 100). Also, the hardware key monitor 134 synchronizes its real-time clock 136 using the timestamp received from the hardware key 130 (block 522) and configures its linear feedback shift register 138 using the polynomial received from the hardware key 130 (block 524). For example, the hardware key monitor 134 configures the linear feedback shift register 138 to have the length specified in the polynomial, to use the taps specified in the polynomial, and the seed value specified in the polynomial. Then, the hardware key monitor 134 indicates to the hardware key 130 that it is ready to receive bits output by the linear feedback shift register 138 of the hardware key 130 on each clock pulse (for example, by sending a "ready" message on the hardware key interface 132) (block 526).

The hardware key monitor 134 receives a bit output by the hardware key 130 on the hardware key interface 132 (block 528) and receives a bit output by the linear feedback shift register 138 of the system 100 (block 530) and compares the two received bits to one another (block 532). If the two bits do not match, the hardware key 130 is no longer considered to be an authorized hardware key 130 (block 514) and an intrusion attempt is considered to have occurred (block 516). Otherwise, if the bits match, the hardware key monitor 134 considers the hardware key 130 to still be an authorized hardware key 130 and loops back to block 528.

In the particular embodiment shown in FIG. 5, the polynomial that is used by the linear feedback shift registers 138 and 216 is changed at periodic intervals. When the current periodic interval has elapsed since the polynomial was last changed (checked in block 534), the hardware key monitor 134 receives a new polynomial from the hardware key 130 via the hardware key interface 132 (block 536). In one implementation of such an embodiment, the new polynomial is transmitted to the system 100 using stream cipher encryption by XOR'ing the new polynomial, bit-by-bit, with the output of the linear feedback shift register 216. In such an implementation, the hardware key monitor 134 decrypts the received encrypted bit stream (having the length of a new polynomial) by XOR'ing the received bit stream with the output of the linear feedback shift register 138 and using the resulting output bit stream as the new key. In other implementations, the transmission of the new polynomial is encrypted and decrypted in other ways or is not encrypted. After receiving the new polynomial, the hardware key monitor 134 then re-configures the linear feedback shift register 138 using the new polynomial (block 538) and indicates to the hardware key 130 that it is ready to receive bits output by the linear feedback shift register 216 (looping back to block 526).

The hardware key technology described in connection with FIGS. 1 through 5 can be used in many ways. For example, such hardware key technology can be used to determine whether to permit access to the debug interface 110 of the system 100. One such embodiment is described below in connection with FIG. 6. In other embodiments, such hardware key technology can be used to determine a mode in which the application-specific functionality 104 and/or the anti-tamper functionality 102 operates.

Figure 6:
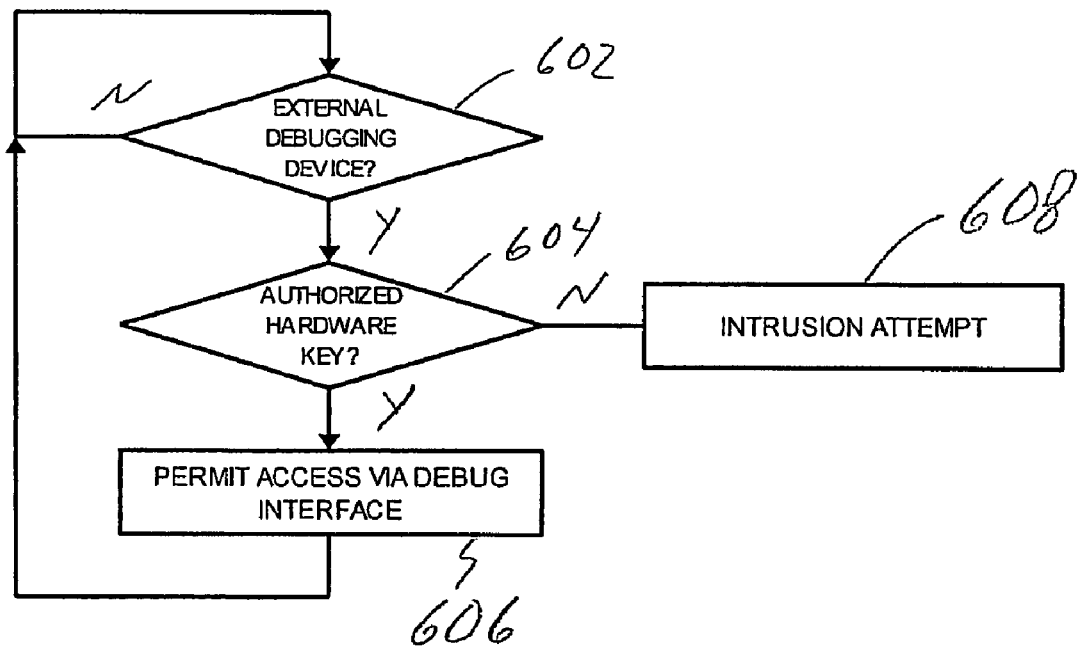
FIG. 6 is a flow diagram of one embodiment of a method of providing access to a debug interface.

FIG. 6 is a flow diagram of one embodiment of a method 600 of providing access to a debug interface. The embodiment of method 600 is described here as being implemented using the system 100 of FIG. 1, the hardware key 130 of FIG. 2, and the methods 400 and 500 of FIGS. 4 and 5, respectively. Other embodiments are implemented in other ways. The processing of method 600, in the embodiment shown in FIG. 6, is performed primarily by the debug security functionality 116 of the system 100.

When the debug security functionality 116 determines that an external debugging device 112 is communicatively coupled to the debug interface 110 of the system 100 (checked in block 602), the debug security functionality 116 checks if an authorized hardware key 130 is communicatively coupled to the hardware key interface 132 that permits access to the debug interface 110 by an external debugging device 112 (block 604). As noted above in connection with FIG. 5, while a hardware key 130 is communicatively coupled to the hardware key interface 132 of the system 100, the hardware key monitor 134 determines if that hardware key 130 is authorized. If it is, the hardware key monitor 134 informs other parts of the system 100 (including the debug security functionality 116) and also informs the other parts of the system 100 as to what mode the hardware key 130 is associated with. For example, in the embodiment shown in FIG. 6, access is permitted to the debug interface 110 by an external debugging device 112 coupled thereto when an authorized hardware key 130 associated with the test mode is communicatively coupled to the hardware key interface 132 of the system 100.

If an authorized hardware key 130 is communicatively coupled to the hardware key interface 132 that permits access to the debug interface 110 by an external debugging device 112, the debug security functionality 116 permits access to the debug interface 110 by an external debugging device 112 coupled thereto (block 606). In one implementation of such an embodiment, the debug security functionality 116 comprises one or more switches or relays located between the debug interface 110 and the debug functionality 114 and, when an authorized hardware key 130 is communicatively coupled to the hardware key interface 132 that permits access to the debug interface 110 by an external debugging device 112, the debug security functionality 116 closes such switches or relays such that the debug interface 110 is communicatively coupled to the debug functionality 114 and able to receive, interpret, and/or carry out any commands that are received from the external debugging device 112.

While an external debugging device 112 is communicatively coupled to debug interface 110, the debug security functionality 116 continues to check for an authorized hardware key 130 that permits access to the debug interface 110 on the hardware key interface 132 (looping back to block 602).

If an authorized hardware key 130 is not communicatively coupled to the hardware key interface 132 that permits access to the debug interface 110 by an external debugging device 112 when an external debugging device 114 is communicatively coupled to the debug interface 110, the debug security functionality 116 informs one or more other components of the system 100 that an intrusion attempt is considered to have occurred (block 608). In one implementation, when an intrusion attempt occurs, the anti-tamper response mechanism 124 takes one or more anti-tamper-related actions in response to the intrusion attempt.

Permitting an external debugging device 112 to interact with the debug functionality 114 of the system 100 only if an authorized hardware key 130 that permits access to the debug interface 110 is communicatively coupled to the hardware key interface 132 provides protection against unauthorized access to the debug interface 110 (for example, in the form of unauthorized reverse-engineering of the system 100). This is desirable in some applications since the debug interface 110 typically provides a mechanism to view and/or change the state of one or more of the components of the system 100.

Figure 7A:
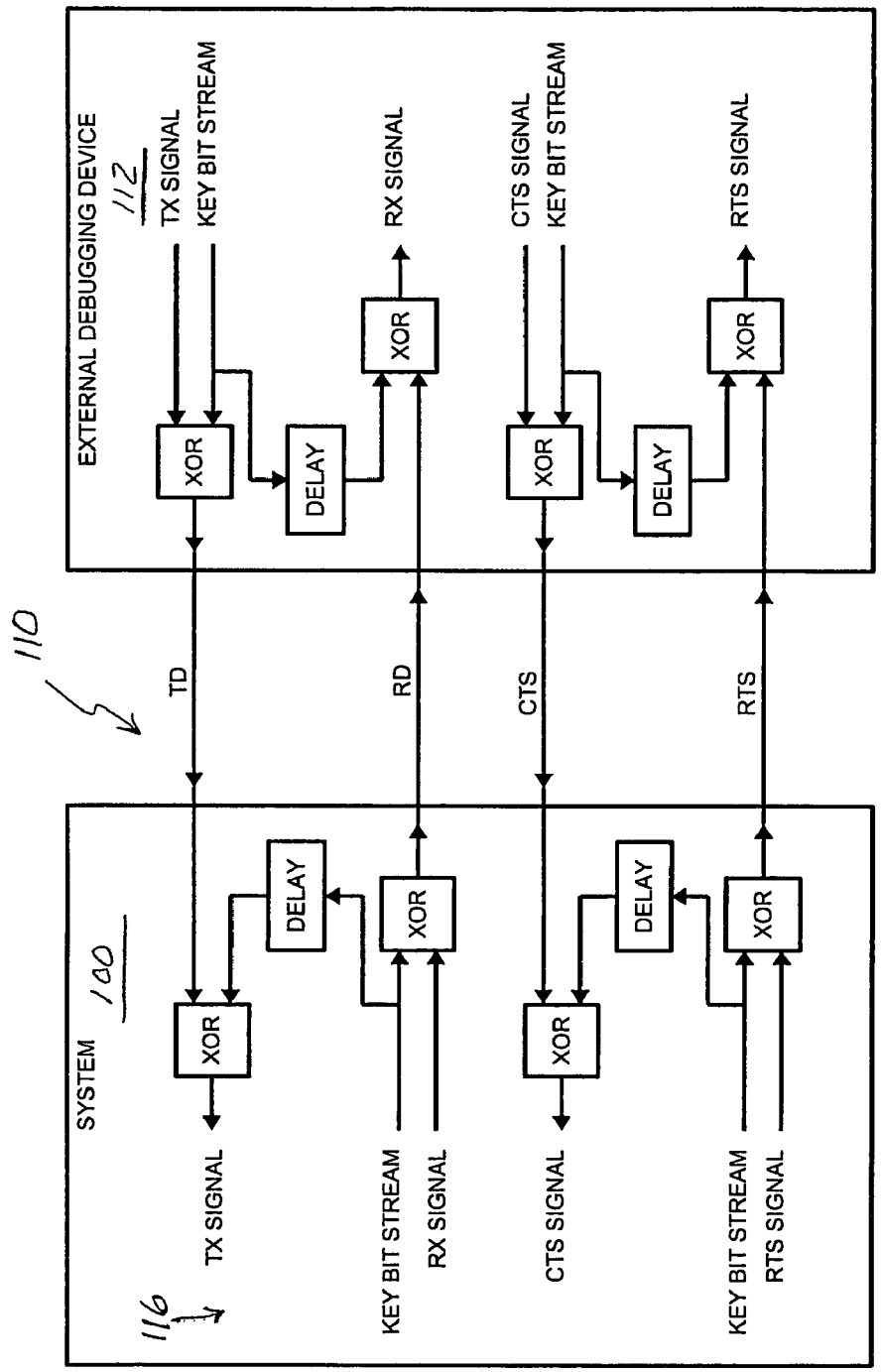

Another way to protect the debug interface 110 (for example, from reverse engineering) is to encrypt or scramble communications that occur over the debug interface 110. FIG. 7A is a high-level block diagram illustrating one approach to encrypting and decrypting communications that occur over a debug interface 110. In the example shown in FIG. 7A, the debug interface 110 comprises a serial interface having a transmit data (TD) line, a receive data (RD) line, a ready-to-send (RTS) line and a clear-to-send (CTS) line. For the system 100, the TD and CTS lines are inputs and the RD and RTS lines are outputs. For the external debugging device 112, the TD and CTS lines are outputs and the RD and RTS lines are inputs.

In the particular embodiment shown in FIG. 7A, each communication that occurs over the debug interface 110 is encrypted by XOR'ing the particular communication with the bit stream generated by the hardware key 130 (also referred to here as the "key bit stream") (not shown in FIG. 7A). For example, as shown in FIG. 7A, the debug security functionality 116 encrypts any communications that are to occur over the RD and RTS lines by XOR'ing the communications on, a bit-for-bit basis, with the key bit stream received from the hardware key 130. The encrypted communications are then communicated over the RD and RTS lines, respectively. The external debugging device 112 uses the same key bit stream to decrypt the encrypted communications received on the RD and RTS lines by XOR'ing, on a bit-for-bit basis, the encrypted communications received on those lines with the same key bit stream used to encrypt the communications. In order to maintain synchronization with respect to the key bit stream used for encryption, an appropriate delay is added to the key bit stream used for decryption that is equal to the amount of time it takes to shift the bits communicated on the RD and RTS lines from the system 100 to the external debugging device 112. After decrypting, the communications are used in the debugging processing performed by the external debugging device 112.

In the particular embodiment shown in FIG. 7A, the external debugging device 112 receives the key bit stream generated by the hardware key 130 directly from the hardware key 130. For example, in one implementation, the hardware key 130 is integrated into the external debugging device 112. In another implementation, the hardware key 130 is communicatively coupled to both the system 100 and the external debugging device 112.

As shown in FIG. 7A, the external debugging device 112 encrypts any communications that are to occur over the TD and CTS lines by XOR'ing the communications on, a bit-for-bit basis, with the key bit stream received from the hardware key 130. The encrypted communications are then communicated over the TD and CTS lines, respectively. The encrypted communications are received on the TD and CTS lines of the debug interface 110 and then decrypted by the debug security functionality 116. The debug security functionality 116 uses the same key bit stream to decrypt the encrypted communications received on the TD and CTS lines by XOR'ing, on a bit-for-bit basis, the encrypted communications received on those lines with the same key bit stream used to encrypt the communications. In order to maintain synchronization with respect to the key bit stream used for encryption, an appropriate delay is added to the key bit stream used for decryption that is equal to the amount of time it takes to shift the bits communicated on the TD and CTS lines from the external debugging device 112 to the system 100. After decrypting, the communications are used in the debugging processing performed by the debug functionality 114 (not shown in FIG. 7A).

In the embodiment shown in FIG. 7A, a stream cipher is used to encrypt the communications that occur over the debug interface 110. In other embodiments, other types of encryption are used (for example, symmetric or asymmetric block ciphers). Also, in the embodiment shown in FIG. 7A, the external debugging device 112 receives the key bit stream directly from the hardware key 130. In another embodiment, the external debugging device 112 itself generates a key bit stream that is used to encrypt and decrypt communications that occur over the debug interface 110. One example of a protocol for exchanging information used by an external debugging device 112 to generate the key bit stream is shown in FIGS. 8 through 9.

Figure 8:
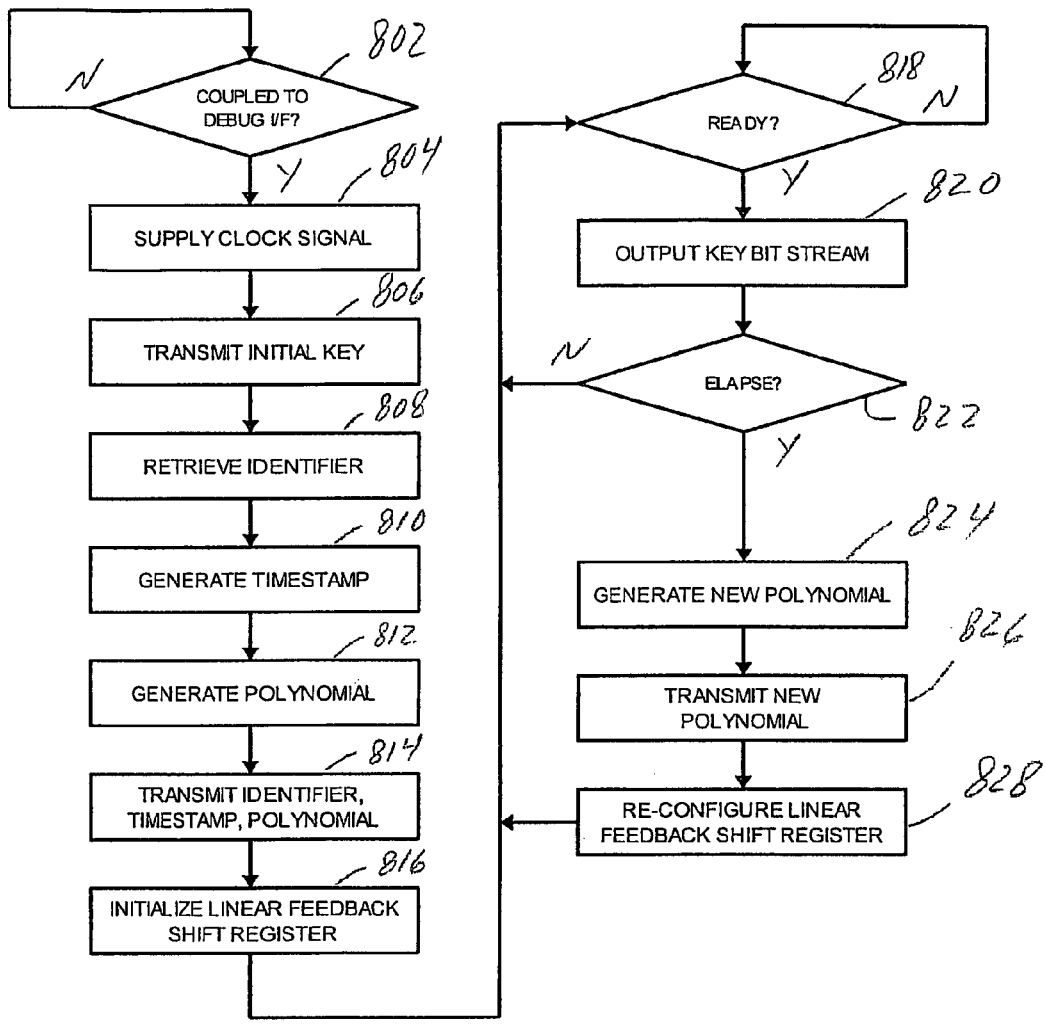
FIG. 8 is a high-level flow diagram of one embodiment of a method 800 performed by an external debugging device.
Figure 9:
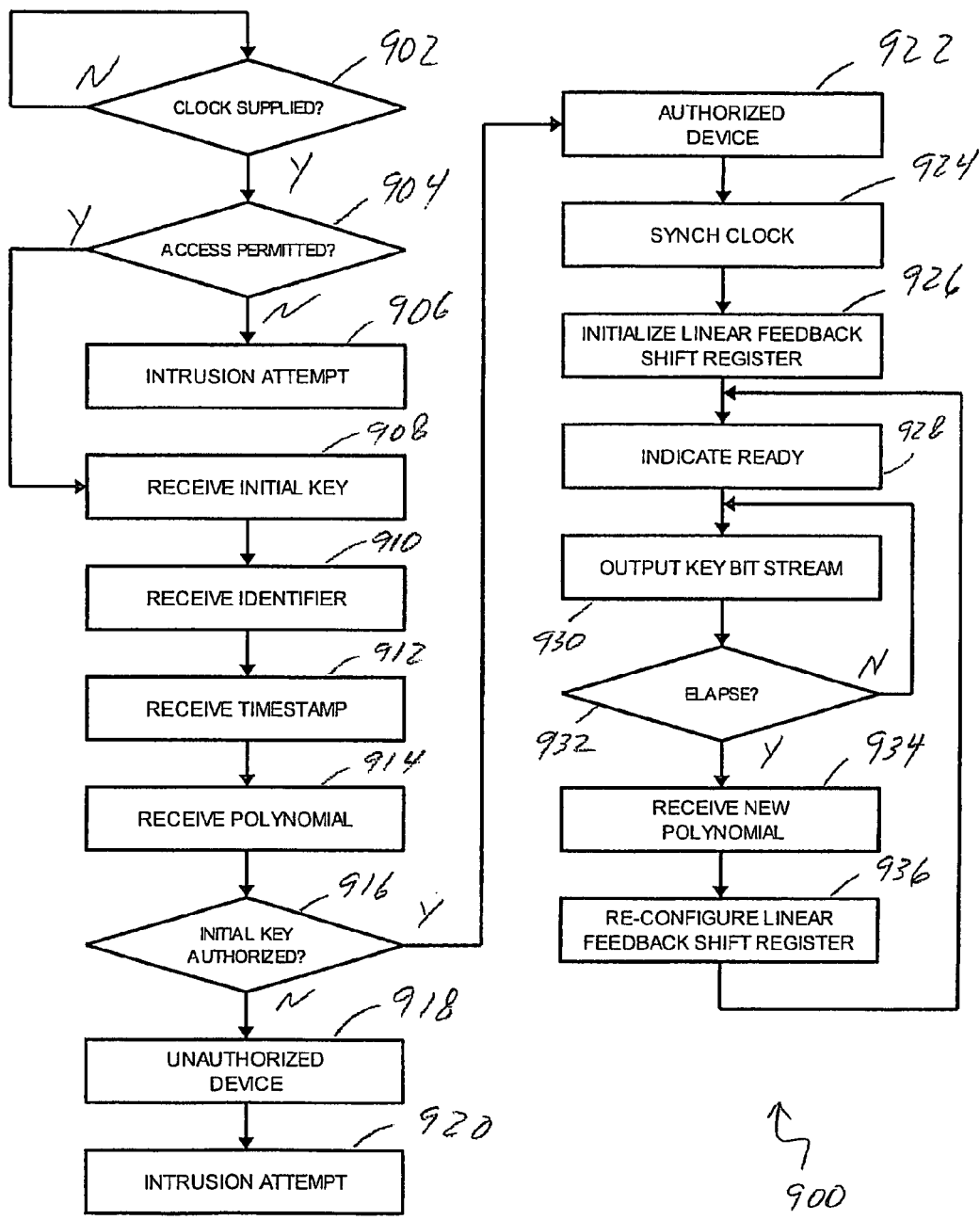
FIG. 9 is a high-level flow diagram of one embodiment of a method 900 performed by the system of FIG. 1.
Figure 10:
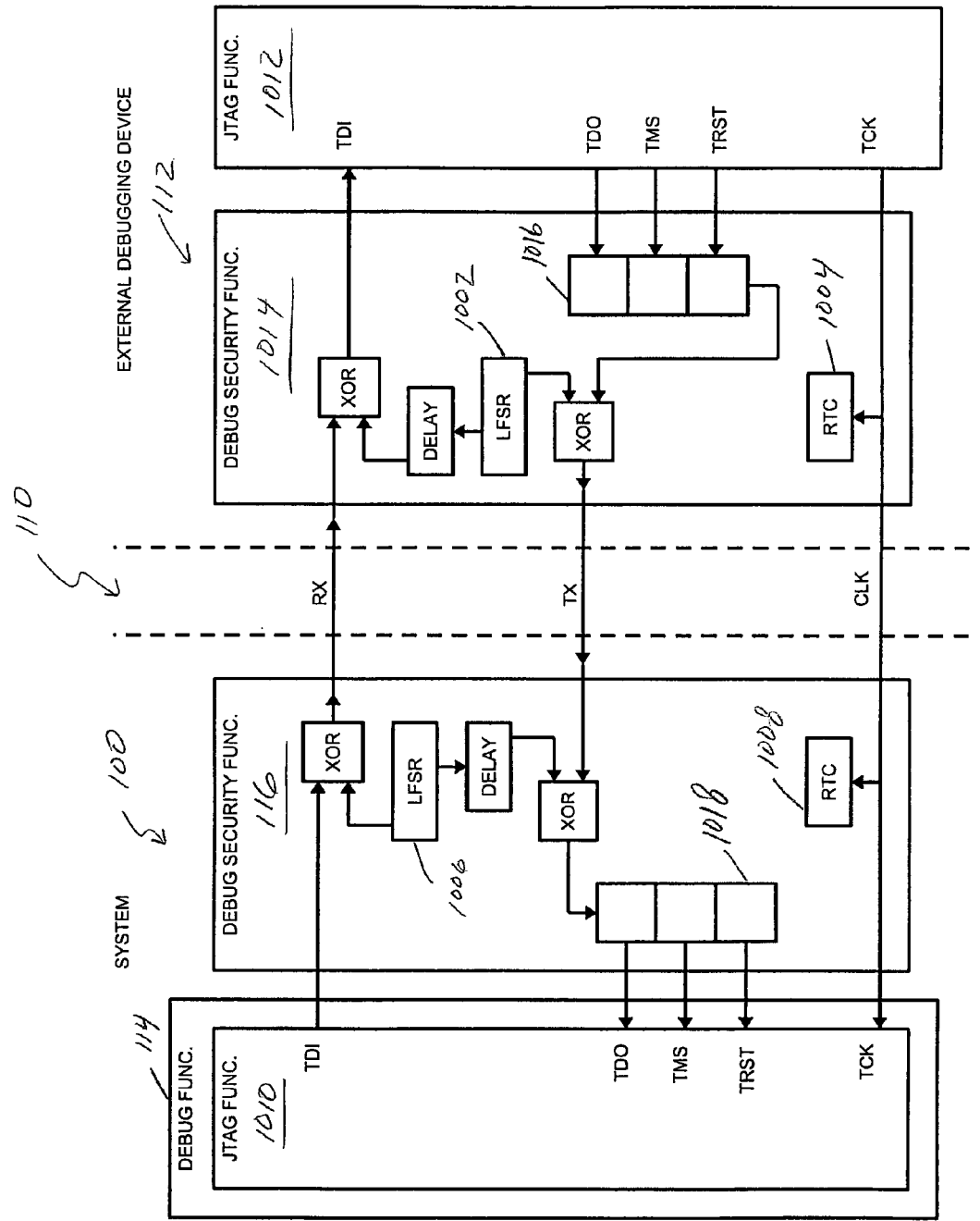
FIG. 10 is high-level block diagram illustrating one approach to encrypting and decrypting communications that occur over a debug interface.

FIG. 8 is a high-level flow diagram of one embodiment of a method 800 performed by the external debugging device 112 and FIG. 9 is a high-level flow diagram of one embodiment of a method 900 performed by the system 100. Methods 800 and 900 are performed in those embodiments where communications between any external debugging device 112 and the system 100 are encrypted. Methods 800 and 900 are described here as being implemented using the system 100 and external debugging device 112 of FIG. 1 and the hardware key 130 of FIG. 2, although other embodiments are implemented in other ways. In the embodiment of method 800 shown in FIG. 8, the processing described here in connection with method 800 is performed by the external debugging device 112 (for example, by software and/or firmware executing on the debugging device 112). In the embodiment of method 900 shown in FIG. 9, the processing described here in connection with method 900 is performed primarily by the debug security functionality 116 of the system 100. In such an embodiment, the external debugging device 112 comprises (as shown in FIG. 10) a linear feedback shift register 1002 (and an associated real-time clock 1004) and the debug security functionality 116 includes a separate linear feedback shift register 1006 (and an associated real-time clock 1008) for encrypting and decrypting communications over the debug interface 110.

FIG. 7B is a high-level block diagram illustrating an alternative approach to encrypting and decrypting communications that occur over a debug interface 110. In the approach shown in FIG. 7B, a synchronous link is used over the debug interface 110. In the example shown in FIG. 7B, the debug interface 110 comprises a serial interface having a transmit data (TD) line, a receive data (RD) line, a receive clock (RD CLOCK) line, and a transmit clock (TD CLOCK) line. For the system 100, the TD and TD CLOCK lines are inputs and the RD and RD CLOCK lines are outputs. For the external debugging device 112, the TD and TD CLOCK lines are outputs and the RD and RD CLOCK lines are inputs.

Each communication that occurs over the debug interface 110 is encrypted by XOR'ing the particular communication with the bit stream generated by the hardware key 130 (also referred to here as the "key bit stream"). For example, as shown in FIG. 7B, the debug security functionality 116 encrypts any communications that are to occur over the RD line with the key bit stream received from the hardware key 130. The communications occurring over the debug interface 110, in such an example, are synchronous with the RD CLOCK line being used to clock data on the RD line from the system 100 to the external debugging device 112. The external debugging device 112 uses the same key bit stream to decrypt the encrypted communications received on the RD line by XOR'ing, on a bit-for-bit basis, the encrypted communications received on the RD line with the same key bit stream used to encrypt the communications. In order to maintain synchronization with respect to the key bit stream used for encryption, an appropriate delay is added to the key bit stream used for decryption that is equal to the amount of time it takes to shift the bits communicated on the RD line from the system 100 to the external debugging device 112 and additional delays for crossing clock boundaries are removed. After decrypting, the communications are used in the debugging processing performed by the external debugging device 112.

In the particular example shown in FIG. 7B, the external debugging device 112 receives the key bit stream generated by the hardware key 130 directly from the hardware key 130. For example, in one implementation, the hardware key 130 is integrated into the external debugging device 112. In another implementation, the hardware key 130 is communicatively coupled to both the system 100 and the external debugging device 112. 1002 (and an associated real-time clock 1004) and the debug security functionality 116 includes a separate linear feedback shift register 1006 (and an associated real-time clock 1008) for encrypting and decrypting communications over the debug interface 110

As shown in FIG. 7B, the external debugging device 112 encrypts any communications that are to occur over the TD line by XOR'ing the communications on, a bit-for-bit basis, with the key bit stream received from the hardware key 130. The TD CLOCK line is used to clock data on the TD line from the external debugging device 112 to the system 100. The encrypted communications are received on the TD line of the debug interface 110 by the system 100 and then decrypted by the debug security functionality 116. The debug security functionality 116 uses the same key bit stream to decrypt the encrypted communications received on the TD line by XOR'ing, on a bit-for-bit basis, the encrypted communications received on those lines with the same key bit stream used to encrypt the communications. In order to maintain synchronization with respect to the key bit stream used for encryption, an appropriate delay is added to the key bit stream used for decryption that is equal to the amount of time it takes to shift the bits communicated on the TD line from the external debugging device 112 to the system 100 and additional delays for crossing clock boundaries are removed. After decrypting, the communications are used in the debugging processing performed by the debug functionality 114 (not shown in FIG. 7B).

As shown in FIG. 8, when the external debugging device 112 is coupled to the debug interface 110 of the system 100 (checked in block 802), the external debugging device 112 supplies a clock signal to the system 100 via the debug interface 110 (block 804) and transmits an initial key to the system 100 via the debug interface 110 (block 806). In this embodiment, the clock signal provided by the external debugging device 112 is used by the system 100 as the clock for the communications that occur on the debug interface 110 and (after synchronizing and initialization) for the linear feedback shift register 1006 of the debug security functionality 116 that is used for encrypting and decrypting communications that occur over the debug interface 110. In one implementation of such an embodiment, the transmission of the initial key is encrypted by the external debugging device 112 using a symmetric encryption algorithm; in another implementation of such an embodiment, the transmission of the initial key is encrypted by the external debugging device 112 using an asymmetric encryption algorithm. In other implementations, this initial transmission is not encrypted. Moreover, any appropriate data transmission scheme can be used for the data transmissions between the external debugging device 112 and the system 100 over the debug interface 110.

After transmitting the initial key, the external debugging device 112 retrieves an identifier for the external debugging device 112 (block 808) and generates a timestamp (block 810). In this embodiment, the clock signal provided to the debug security functionality 116 over the debug interface 110 and the timestamp are generated using the real-time clock 1004 (shown in FIG. 10) included in the external debugging device 112. The timestamp is used by the debug security functionality 116 of the system 100 to synchronize its real-time clock 1008 to the real-time clock 1004 of the external debugging device 112. The external debugging device 112 also generates (or otherwise obtains) a polynomial (block 812). In this embodiment, the polynomial specifies the length of the linear feedback shift registers 1002 and 1006 (that is, the number of cells N of the linear feedback shift registers 1002 and 1006) and the tapped cells of the linear feedback shift registers 1002 and 1006. The polynomial also specifies a seed value that is to be used by the linear feedback shift registers 1002 and 1006. In the embodiment shown in FIG. 8, the external debugging device 112 selects one or more attributes of the polynomial (that is, the length, taps, and/or seed value) using, for example, a random or pseudo-random selection process and/or based on the real-time clock 1004. In other embodiments, the same initial polynomial is used each time the external debugging device 112 is communicatively coupled to the debugging interface 110 of the system 100.

The external debugging device 112 then transmits the identifier, timestamp, and polynomial to the system 100 via the debug interface 110 (block 814). In one implementation of such an embodiment, this transmission is encrypted using symmetric encryption; in another implementation, this transmission is encrypted using asymmetric encryption. In other implementations, this transmission is not encrypted. The external debugging device 112 also initializes the linear feedback shift register 1002 with the polynomial (that is, it configures the linear feedback shift register 1002 to have the number of cells specified by the polynomial, to use the taps indicated in the polynomial, and to use the seed value specified in the polynomial) (block 816).

After the system 100 indicates that it is ready (for example, by sending a "ready" message on the debug interface 110) (checked in block 818), the external debugging device 112 starts outputting the key bit stream from the linear feedback shift register 1002 on each clock pulse (block 820). The external debugging device 112 uses the key stream generated by the linear feedback shift register 1002 to encrypt and decrypt communications that occur over the debug interface 110.

In the particular embodiment shown in FIG. 8, the polynomial that is used by the linear feedback shift registers 1002 and 1006 is changed at periodic intervals. When the current periodic interval has elapsed since last changing the polynomial (checked in block 822), the external debugging device 112 generates a new polynomial (block 824) and transmits the new polynomial to the system 100 via the debug interface 110 (block 826). In one implementation of such an embodiment, the new polynomial is transmitted to the system 100 using the same encryption techniques that are used to transmit regular data over the debug interface 110. In other implementations, the transmission of the new polynomial is encrypted in other ways or is not encrypted. After transmitting the new polynomial, the external debugging device 112 then re-configures the linear feedback shift 1002 using the new polynomial (block 828) and loops back to block 818 to resume outputting the key bit stream using the new polynomial and the linear feedback shift register 1002.

The processing performed by the debug security functionality 116 in response to the processing of method 800 performed by the external debugging device 112 is shown in FIG. 9.

When the debug security functionality 116 of the system 100 detects that a clock signal is being supplied on a clock line of the debug interface 110 (checked in block 902), the debug security functionality 116 checks if access to the debug interface 110 is permitted (for example, as described above in connection with FIG. 6) (checked in block 904). If access is not permitted, the debug security functionality 116 informs one or more other components of the system 100 that an intrusion attempt is considered to have occurred (for example, as described above in connection with FIG. 6) (block 906).

If access is permitted, the debug security functionality 116 receives, from the external debugging device 112, the initial key (block 908), the identifier 864 (block 910), the timestamp (block 912) and the polynomial (block 914). In an implementation where the external debugging device 112 transmits this data in encrypted form, the debug security functionality 116 decrypts the encrypted data using a suitable decryption technique.

The debug security functionality 116 then determines if the received initial key is a key that the system 100 considers an authorized key (block 916). In one implementation of such an approach, the system 100 stores a set of authorized keys and the debug security functionality 116 determines if the initial key received from the external debugging device 112 matches any of the keys contained in the set. If there is not a match, the initial key received from the external debugging device 112 is not considered to be an authorized key and the external debugging device 112 is not authorized (block 918). Also, when this happens, in the embodiment shown in FIG. 9, an intrusion attempt is considered to have occurred (block 920). In one implementation, when an intrusion attempt occurs, the anti-tamper response mechanism 124 takes one or more anti-tamper related actions in response to the intrusion attempt.

If there is a match, the external debugging device 112 is an authorized device (block 922) and the processing described here in connection with blocks 924 through 936 is performed.

If the external debugging device 112 is authorized, the debug security functionality 116 synchronizes the real-time clock 1008 (shown in FIG. 10) using the timestamp received from the external debugging device 112 (block 924) and configures its linear feedback shift register 1006 using the polynomial received from the external debugging device 112 (block 926). For example, the debug security functionality 116 configures the linear feedback shift register 1006 to have the length specified in the polynomial, to use the taps specified in the polynomial, and the seed value specified in the polynomial. Then, the debug security functionality 116 indicates to the external debugging device 112 that it is ready to communicate (for example, by sending a "ready" message on the debug interface 110) (block 928). Then, the debug security functionality 116 starts outputting the key bit stream from the linear feedback shift register 1006 on each clock pulse (block 930). The debug security functionality 116 uses the key stream generated by the linear feedback shift register 1006 to encrypt and decrypt communications that occur over the debug interface 110.

In the particular embodiment shown in FIG. 9, the polynomial that is used by the linear feedback shift registers 1002 and 1006 is changed at periodic intervals. When the current periodic interval has elapsed since the polynomial was last changed (checked in block 932), the debug security functionality 116 receives a new polynomial from the external debugging device 112 via the debug interface 110 (block 934). In one implementation of such an embodiment, the new polynomial is transmitted to the debugging security functionality 116 using the same encryption techniques that are used to transmit regular data over the debug interface 110. In other implementations, the transmission of the new polynomial is encrypted in other ways or not encrypted.

After receiving the new polynomial, the debug security functionality 116 then re-configures the linear feedback shift 1006 using the new polynomial (block 936) and indicates to the external debugging device 112 that it is ready to communicate over the debug interface 110 using the bit stream output by the linear feedback shift register 1006 using the new polynomial to encrypt and decrypt data (looping back to block 928).

In one implementation of such an embodiment, the bit streams generated by the linear feedback shift registers 1002 and 1006 are used as the key bit stream to encrypt and decrypt the communications that occur over the debug interface 110 in the manner described above in connection with FIG. 7A. In another embodiment, such a key bit stream is used to encrypt and decrypt communications over the debug interface 110 in other ways. One such alternative embodiment is shown in FIG. 10.

FIG. 10 is high-level block diagram illustrating one approach to encrypting and decrypting communications that occur over a debug interface 110. In the example shown in FIG. 10, the external debugging device 112 and the debug functionality 114 of the system 100 support the JTAG debugging interface protocol. The JTAG protocol is a synchronous protocol (as opposed to the asynchronous protocol described above in connection with FIG. 7A). In order to maintain synchronization with respect to the key bit stream used for encryption, an appropriate delay is added to the key bit stream used for decryption that is equal to the amount of time it takes to shift the bits communicated on the RX and TX lines between the system 100 and the external debugging device 112.

In the particular embodiment shown in FIG. 10, the debug functionality 114 and the external debugging device 112 both include JTAG functionality 1010 and 1012, respectively, that implements the JTAG protocol. The JTAG functionality 1010 and 1012 of the system 100 and the external debugging device 112, respectively, support the JTAG interface. The JTAG interface comprises a test clock (TCK) line over which a clock signal is supplied from the external debugging device 112 to the debug functionality 114 of the system 100 for synchronizing communications over the JTAG interface. The JTAG interface comprises a test mode state (TMS) line over which a control signal is communicated from the external debugging device 112 to the debug functionality 114 of the system 100 to indicate the next test state for the JTAG functionality 1010 and 1012. The JTAG interface comprises a test reset (TRST) line over which a control signal is communicated from the external debugging device 112 to the debug functionality 114 of the system 100 to reset the JTAG functionality 1010 and 1012. The JTAG interface comprises a test data out (TDO) line over which data is communicated from the external debugging device 112 to the debug functionality 114 of the system 100. The JTAG interface comprises a test data in (TDI) line over which data is communicated from the debug functionality 114 of the system 100 to the external debugging device 112.

However, in the embodiment shown in FIG. 10, the JTAG functionality 1010 of the system 100 does not directly communicate with the JTAG functionality of the external debugging device 112 using the JTAG interface. Instead, communications between the JTAG functionality 1010 of the system 100 and the JTAG functionality of the external debugging device 112 are encrypted and converted, as described below, for communication over the debug interface 110 by the debug security functionality 116 of the system 100 and debug security functionality 1014 included in the external debugging device 112.

As noted above, the debug security functionality 116 of the system 100 comprises a linear feedback shift register 1006 and the debug security functionality 1014 of the external debugging device 112 comprises a linear feedback shift register 1002. The linear feedback shift registers 1002 and 1006 generate the same key bit stream that is used for encrypting and decrypting communications over the debug interface 110.

The debugging security functionality 116 of the system 100 and the debugging security functionality 1014 of the external debugging device 112 configure the linear feedback shift registers 1006 and 1002, respectively, using the same polynomial and synchronize the respective real-time clocks 1008 and 1004, respectively, using information that is provided by the external debugging device 112 to the system 100 as described above in connection with FIGS. 8 and 9.

In the embodiment shown in FIG. 10, the debug interface 110 comprises the following lines a transmit (TX) line for data to be transmitted from the external debugging device 112 to the system 100, a receive (RX) line for data to be transmitted from the system 100 to the external debugging device 112, and a clock (CLK) line for a clock signal to be transmitted from the external debugging device 112 to the system 100.

In the embodiment shown in FIG. 10, a clock signal is output directly (that is, without encryption) from the TCK line of the JTAG functionality 1012 of the external debugging device 112 to the TCK line of the JTAG functionality 1010 of the debug functionality 114 over the CLK line of the debug interface 110. This TCK signal is also used by real-time clock 1008 of the debug security functionality 116 and the real-time clock 1004 of the debug security functionality 1014 to derive the clock signal that is used to shift the cells of the linear feedback shift registers 1006 and 1002, respectively.

In the embodiment shown in FIG. 10, the data that is to be transmitted from the JTAG functionality 1010 of the system 100 to the external debugging device 112 over the TDI line is received by the debug security functionality 116, which encrypts the received TDI-line data by XOR'ing the TDI-line data with a key bit stream that is generated by the linear feedback shift register 1006 of the debug security functionality 116. The encrypted TDI-line data is transmitted by the debug security functionality 116 on the RX line of the debug interface 110 to the external debugging device 112. The debug security functionality 1014 of the external debugging device 112 receives and decrypts the encrypted TDI-line data by XOR'ing the TDI-line data with a key bit stream that is generated by the linear feedback shift register 1002 of the debug security functionality 1014 (which should be the same key bit stream as the key bit stream generated by the linear feedback shift register 1006 to encrypt the TDI-line data). The debug security functionality 1014 then passes the decrypted TDI-line data to the JTAG functionality 1012 on the TDI line for processing by the JTAG functionality 1012.

The data that is to be transmitted from the JTAG functionality 1012 of the external debugging device 112 over the TMS line, the TRST line, and the TDO line is received by the debug security functionality 1014. The debug security functionality 1014 comprises a parallel-to-serial buffer 1016 that buffers the bit value of each of the TMS line, the TRST line, and the TDO line on each TCK line clock pulse. The bit values stored in the buffer 1016 are then shifted out of the buffer 1016 in serial form and encrypted by XOR'ing the serial data with a key bit stream that is generated by the linear feedback shift register 1002 of the debug security functionality 1014. The encrypted data is output on the TX line of the debug interface 110 to the system 100.

The debug security functionality 116 of the system 100 receives the encrypted data from the TX line of the debug interface 110. The debug security functionality 116 of the system 100 decrypts the received encrypted data by XOR'ing the received encrypted data with a key bit stream that is generated by the linear feedback shift register 1006 of the debug security functionality 116 (which should be the same key bit stream as the key bit stream generated by the linear feedback shift register 1002 to encrypt the data).

The debug security functionality 116 of the system 100, in the embodiment shown in FIG. 10, also includes a serial-to-parallel buffer 1018 into which the decrypted data received from the debug interface 110 is shifted. After all the bits for the TMS line, the TRST line, and the TDO line are shifted into the serial-to-parallel buffer 1018, the data is read out from the buffer 1018 in parallel form and supplied to the JTAG functionality 1010 of the system 100 on the TMS line, the TRST line, and the TDO line. In this embodiment, to account for the parallel-to-serial and serial-to-parallel conversions, the clock frequency of the clock that is used to clock the linear feedback shift registers 1006 and 1002 and to communicate data over the debug interface 110 is at least three times faster than the clock frequency of the TCK signal that is used by the JTAG functionality 1010 and 1012.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An electronic system contained within an enclosure, the electronic system comprising:
    JTAG circuitry that implements at least a portion of a JTAG protocol, wherein the JTAG circuitry supports a test data in (TDI) line, a test data out (TDO) line, a test rest (TR) line, a test mode state (TMS) line, and a test clock (TCLK) line;
    a debug interface to communicatively couple the JTAG circuitry to a debug device external to the enclosure, wherein the debug interface comprises a transmit (TX) line, a receive (RX) line, and a clock (CLK) line;
    wherein the system transmits data output by the JTAG circuitry on the TDI input on the RX line of the debug interface and receives data from the debug device on the TX line of the debug interface and provides the received data to the JTAG circuitry on the TDO line, the TR line and the TMS line,
    wherein the debug interface encrypts data transmitted on the debug interface to the debug device and decrypts data received on the debug interface from the debug device.

2. The system of claim 1, wherein the system uses key information to encrypt data transmitted on the debug interface and to decrypt data received on the debug interface from the debug device.

3. The system of claim 2, wherein the key information comprises a stream cipher.

4. The system of claim 3, wherein the system encrypts data transmitted on the debug interface by performing a XOR operation on each bit of data transmitted on the RX line of the debug interface with a respective bit of the stream cipher and wherein the system decrypts data received on the debug interface by performing a XOR operation on each bit of data received on the TX line of the debug interface with a respective bit of the stream cipher.

5. The system of claim 4, further comprising a serial-to-parallel buffer that receives each decrypted bit received on TX line and applies the respective decrypted bit to one of the TDO line, TR line and the TMS line.

6. The system of claim 3, further comprising a hardware key interface, wherein communications are not permitted on the debug interface unless a hardware key is communicatively coupled to the hardware key interface and the hardware key is authorized.

7. The system of claim 6, wherein the hardware key interface receives information from the hardware key that is used to encrypt and decrypt data communicated over the debug interface.

8. The system of claim 6, wherein the information received from the hardware key varies from time to time in order to change the manner in which the stream cipher is generated.

9. The system of claim 6, wherein the information received from the hardware key comprises a polynomial used by the system to generate the stream cipher.

10. The system of claim 9, wherein the stream cipher is generated using a linear shift feedback register, wherein the polynomial comprises a seed value, a length of the linear shift feedback register, and one or more taps of the linear shift feedback register.

11. A debug device comprising:
    JTAG circuitry that implements at least a portion of a JTAG protocol, wherein the JTAG circuitry supports a test data in (TDI) line, a test data out (TDO) line, a test rest (TR) line, a test mode state (TMS) line, and a test clock (TCLK) line;
    a debug interface to communicatively couple the debug device to a system under test that is external to the debug device, wherein the debug interface comprises a transmit (TX) line, a receive (RX) line, and a clock (CLK) line;
    wherein the debug device transmits data output by the JTAG circuitry on the TDO line, the TR line and the TMS line on the TX line of the debug interface and receives data from the system under test device on the RX line of the debug interface and provides the received data to the JTAG circuitry on the TDI input, wherein the debug interface encrypts data transmitted on the debug interface to the system under test and decrypts data received on the debug interface from the system under test.

12. The debug device of claim 11, wherein the debug device uses key information to encrypt data transmitted on the debug interface and to decrypt data received on the debug interface from the system under test.

13. The debug device of claim 12, wherein the key information comprises a stream cipher.

14. The debug device of claim 13, wherein the manner in which the stream cipher is generated varies from time to time.

15. The debug device of claim 14, wherein a polynomial is used by the debug device to generate the stream cipher.

16. The debug device of claim 14, further comprising a linear shift feedback register, wherein the stream cipher is generated using the linear shift feedback register, wherein the polynomial comprises a seed value, a length of the linear shift feedback register, and one or more taps of the linear shift feedback register.

17. The debug device of claim 12, wherein the debug device encrypts data transmitted on the debug interface by performing a XOR operation on each bit of data transmitted on the TX line of the debug interface with a respective bit of the stream cipher and wherein the debug device decrypts data received on the debug interface by performing a XOR operation on each bit of data received on the RX line of the debug interface with a respective bit of the stream cipher.

18. The debug device of claim 17, further comprising a serial-to-parallel buffer that receives each bit output on the TDO line, TR line and the TMS line and successively outputs each received for encrypting.

19. The debug device of claim 12, wherein the debug interface receives from the system under test information used to generate the key information.

20. The debug device of claim 12, wherein the debug interface receives information from a hardware key communicatively coupled to the system under test, wherein the hardware key information is used to generate the key information.

21. A method comprising:
transmitting data from a test data in (TDI) line of a JTAG interface included in a system under test on a first line of a debug interface of the system under test for communicatively coupling the system under test to a debug device external to the system under test;
receiving data on a second line of the debug interface of the system under test;
providing the data received on the second line of the debug interface to a test data out (TDO) line, a test rest (TR) line, and a test mode state (TMS) line of the JTAG interface;
receiving a clock signal on a clock line of the debug interface; and
providing the clock signal on the test clock (TCLK) line of the JTAG interface,
wherein the debug interface encrypts data transmitted to the debug device and decrypts data received from the debug device.

22. A method comprising:
transmitting data from a test data out (TDO) line, a test rest (TR) line, and test mode state (TMS) of a JTAG interface included in a debug device on a first line of a debug interface of the debug device for communicatively coupling the debug device to a system under test;
receiving data from a second line of the debug interface;
providing the data received on the second line of the debug interface to the test data in (TDI) line of the JTAG interface; and
transmitting a clock signal from a test clock (TCLK) line of the JTAG interface on a clock line of the debug interface,
wherein the debug interface encrypts data transmitted to the system under test and decrypts data received on the debug interface from the system under test.

23. Apparatus comprising:
means for transmitting data from a test data in (TDI) line of a JTAG interface included in system under test on a first line of a debug interface of the system under test for communicatively coupling the system under test to debug device external to the system under test;
means for receiving data on a second line of the debug interface of the system under test; means for providing the data received on the second line of the debug interface to a test data out (TDO) line, a test rest (TR) line, and test mode state (TMS) line of the JTAG interface;
means for receiving a clock signal on a clock line of the debug interface; and
means for providing the clock signal on the test clock (TCLK) line of the JTAG interface,
wherein the debug interface encrypts data transmitted to the debug device and decrypts data received from the debug device.

24. Apparatus comprising:
means for transmitting data from a test data out (TDO) line, a test rest (TR) line, and test mode state (TMS) of a JTAG interface included in a debug device on a first line of a debug interface of the debug device for communicatively coupling the debug device to a system under test;
means for receiving data from a second line of the debug interface;
means for providing the data received on the second line of the debug interface to the test data in (TDI) line of the JTAG interface; and
means for transmitting a clock signal from a test clock (TCLK) line of the JTAG interface on a clock line of the debug interface,
wherein the debug interface encrypts data transmitted to the system under test and decrypts data received on the debug interface from the system under test.

25. A system comprising:
an electronic circuitry contained within an enclosure; and
a debug device external to the enclosure, wherein the electronic device is under test and the debug device is coupled to the electronic device,
wherein the electronic circuitry comprises:
a first JTAG circuitry that implements at least a portion of a JTAG protocol, wherein the first JTAG circuitry supports a test data in (TDI) line, a test data out (TDO) line, a test rest (TR) line, a test mode state (TMS) line, and a test clock (TCLK) line;
a first debug interface to communicatively couple the JTAG circuitry to the debug device, wherein the first debug interface comprises a transmit (TX) line, a receive (RX) line, and a clock (CLK) line;
wherein the electronic circuitry transmits data output by the first JTAG circuitry on the TDI input on the RX line of the first debug interface and receives data from the debug device on the TX line of the first debug interface and provides the received data to the first JTAG circuitry on the TDO line, the TR line and the TMS line, wherein the first debug interface encrypts data transmitted to the debug device and decrypts data received from the debug device;
wherein the debug device comprises:
 a second JTAG circuitry that implements at least a portion of a JTAG protocol, wherein the second JTAG circuitry supports a test data in (TDI) line, a test data out (TDO) line, a test rest (TR) line, a test mode state (TMS) line, and a test clock (TCLK) line;
 a second debug interface to communicatively couple the debug device to the electronic circuitry under test, wherein the second debug interface comprises a transmit (TX) line, a receive (RX) line, and a clock (CLK) line;

wherein the debug device transmits data output by the second JTAG circuitry on the TDO line, the TR line and the TMS line on the TX line of the second debug interface and receives data from the electronic circuitry on the RX line of the second debug interface and provides the received data to the second JTAG circuitry on the TDI input,
wherein the second debug interface encrypts data transmitted to the electronic circuitry and decrypts data received from the electronic circuitry.

\* \* \* \* \*